US011285384B2

(12) United States Patent
Fung et al.

(10) Patent No.: US 11,285,384 B2
(45) Date of Patent: Mar. 29, 2022

(54) SYSTEMS AND METHODS FOR INTERACTIVE EXPERIENCES AND CONTROLLERS THEREFOR

(71) Applicant: TimePlay Inc., Toronto (CA)

(72) Inventors: Elkin Ng Fung, North York (CA); Jonathan Ira Hussman, Toronto (CA); John Andrew Race, Los Angeles, CA (US)

(73) Assignee: TimePlay Inc., Toronto (CA)

( * ) Notice: Subject to any disclaimer, the term of this patent is extended or adjusted under 35 U.S.C. 154(b) by 0 days.

(21) Appl. No.: 16/127,966

(22) Filed: Sep. 11, 2018

(65) Prior Publication Data

US 2019/0176035 A1    Jun. 13, 2019

Related U.S. Application Data

(63) Continuation of application No. 13/955,678, filed on Jul. 31, 2013, now abandoned, which is a (Continued)

(51) Int. Cl.
*A63F 13/31* (2014.01)
*G09B 5/06* (2006.01)
(Continued)

(52) U.S. Cl.
CPC .............. *A63F 13/31* (2014.09); *A63F 13/26* (2014.09); *A63F 13/33* (2014.09); *A63F 13/79* (2014.09);
(Continued)

(58) Field of Classification Search
CPC .......... A63F 13/02; A63F 13/26; A63F 13/00; A63F 2300/00; A63F 13/12; G06F 17/32;
(Continued)

(56) References Cited

U.S. PATENT DOCUMENTS 4,445,187 A    4/1984   Best
4,477,069 A   10/1984   Crudgington, Jr.
(Continued)

FOREIGN PATENT DOCUMENTS

CA    2095820 A1    5/1992
CN    1592899 A     3/2005
(Continued)

OTHER PUBLICATIONS

Schieble, et al. "MobiLenin—Combining A Multi-Track Music Video, Personal Mobile Phones and A Public Display into Multi-User Interactive Entertainment", Proc. of the ACM conf. on Multimedia, ACM Press. pp. 1-10. Dec. 31, 2005 (Dec. 31, 2005).
(Continued)

*Primary Examiner* — Jennifer N Welch
*Assistant Examiner* — Qi Wan
(74) *Attorney, Agent, or Firm* — Bereskin & Parr LLP/S.E.N.C.R.L, s.r.l.

(57) ABSTRACT

Systems and methods of multi-participant interactive experiences are disclosed. Participants located location can interact with one another and share gaming, educational and other experiences. The system includes a coordination node to coordinate experiences between participants and one or more of interactive nodes. At each interactive node there is a main display that shows shared information to each of the participants and to other viewers. Each of the participants also uses a personal controller such as a smart phone which has a personal display. Information that is specific to the participant can be displayed on the personal controller.

20 Claims, 12 Drawing Sheets

Related U.S. Application Data continuation of application No. PCT/CA2012/000087, filed on Feb. 1, 2012.

(60) Provisional application No. 61/472,709, filed on Apr. 7, 2011, provisional application No. 61/438,358, filed on Feb. 1, 2011.

(51) Int. Cl.

| | | |
|---|---|---|
| A63F 13/33 | (2014.01) | |
| A63F 13/26 | (2014.01) | |
| A63F 13/79 | (2014.01) | |
| G09B 5/08 | (2006.01) | |
| G09B 5/10 | (2006.01) | |
| G09B 5/12 | (2006.01) | |
| G09B 5/14 | (2006.01) | |
| H04L 67/131 | (2022.01) | |
| G06F 3/0484 | (2022.01) | |
| H04L 67/10 | (2022.01) | |

(52) U.S. Cl.
CPC ............ *G06F 3/0484* (2013.01); *G09B 5/06* (2013.01); *G09B 5/08* (2013.01); *G09B 5/10* (2013.01); *G09B 5/12* (2013.01); *G09B 5/14* (2013.01); *H04L 67/10* (2013.01); *H04L 67/38* (2013.01); *A63F 2300/204* (2013.01); *A63F 2300/301* (2013.01); *A63F 2300/404* (2013.01); *A63F 2300/406* (2013.01); *A63F 2300/531* (2013.01); *A63F 2300/8023* (2013.01)

(58) Field of Classification Search
CPC .......... G06F 3/048; G06Q 30/02; G09B 5/00; H04L 67/00
See application file for complete search history.

(56) References Cited

U.S. PATENT DOCUMENTS

| | | |
|---|---|---|
| 4,771,344 A | 9/1988 | Fallacaro et al. |
| 4,866,515 A | 9/1989 | Tagawa et al. |
| 4,974,252 A | 11/1990 | Osborne |
| 4,976,438 A | 12/1990 | Tashiro et al. |
| 5,213,555 A | 5/1993 | Hood et al. |
| 5,215,464 A | 6/1993 | Marshall et al. |
| 5,273,437 A | 12/1993 | Caldwell et al. |
| 5,297,802 A | 3/1994 | Pocock et al. |
| 5,465,384 A | 11/1995 | Bejan et al. |
| 5,480,158 A | 1/1996 | Schulze et al. |
| 5,498,002 A | 3/1996 | Gechter |
| 5,517,320 A | 5/1996 | Schuler |
| 5,518,253 A | 5/1996 | Pocock et al. |
| 5,613,909 A | 3/1997 | Stelovsky |
| 5,618,045 A | 4/1997 | Kagan et al. |
| 5,674,128 A | 10/1997 | Holch et al. |
| 5,702,305 A | 12/1997 | Norman et al. |
| 5,737,527 A | 4/1998 | Shiels et al. |
| 5,738,583 A | 4/1998 | Comas et al. |
| 5,759,101 A | 6/1998 | Von Kohorn |
| 5,801,754 A | 9/1998 | Ruybal et al. |
| 5,801,764 A | 9/1998 | Koizumi et al. |
| 5,835,715 A | 11/1998 | Dahl |
| 5,842,871 A | 12/1998 | Cutler et al. |
| 5,857,986 A | 1/1999 | Moriyasu |
| 5,959,717 A | 9/1999 | Chaum |
| 5,973,672 A | 10/1999 | Rice et al. |
| 6,001,017 A | 12/1999 | Okano et al. |
| 6,056,640 A | 5/2000 | Schaaij |
| 6,068,553 A | 5/2000 | Parker |
| 6,210,273 B1 | 4/2001 | Matsuno |
| 6,238,291 B1 | 5/2001 | Fujimoto et al. |
| 6,241,609 B1 | 6/2001 | Rutgers |
| 6,257,982 B1 | 7/2001 | Rider et al. |
| 6,280,323 B1 | 8/2001 | Yamazaki et al. |
| 6,280,325 B1 | 8/2001 | Fisk |
| 6,280,327 B1 | 8/2001 | Leiter et al. |
| 6,300,936 B1 | 10/2001 | Braun et al. |
| 6,346,045 B2 | 2/2002 | Rider et al. |
| 6,354,941 B2 | 3/2002 | Miller et al. |
| 6,409,599 B1 | 6/2002 | Sprout et al. |
| 6,409,604 B1 | 6/2002 | Matsuno |
| 6,500,070 B1 | 12/2002 | Tomizawa et al. |
| 6,507,353 B1 | 1/2003 | Huard et al. |
| 6,540,614 B1 | 4/2003 | Nishino et al. |
| 6,585,590 B2 | 7/2003 | Malone |
| 6,612,578 B2 | 9/2003 | Falciglia |
| 6,705,945 B2 | 3/2004 | Gavin et al. |
| 6,709,335 B2 | 3/2004 | Bates et al. |
| 6,729,959 B1 | 5/2004 | Moore et al. |
| 6,780,108 B1 | 8/2004 | Luciano et al. |
| 6,845,980 B2 | 1/2005 | Falciglia, Sr. |
| 6,921,336 B1 | 7/2005 | Best |
| 6,959,419 B2 | 10/2005 | Taniwaki |
| 6,977,667 B1 | 12/2005 | Burke |
| 6,996,413 B2 | 2/2006 | Inselberg |
| 7,004,839 B2 | 2/2006 | Suzuki et al. |
| 7,278,920 B1 | 10/2007 | Klamer et al. |
| 7,326,117 B1 | 2/2008 | Best |
| 7,445,549 B1 | 11/2008 | Best |
| 7,840,991 B2 | 11/2010 | Dusenberry et al. |
| 8,317,615 B2 | 11/2012 | Takeda et al. |
| 8,684,842 B2 | 4/2014 | Takeda et al. |
| 8,951,124 B2 | 2/2015 | Snoddy et al. |
| 8,961,305 B2 | 2/2015 | Takeda et al. |
| 9,358,457 B2 | 6/2016 | Takeda et al. |
| 2001/0027128 A1* | 10/2001 | Rider ................ A63F 13/12 463/31 |
| 2002/0094860 A1 | 7/2002 | Itkis et al. |
| 2002/0115488 A1 | 8/2002 | Berry et al. |
| 2002/0137562 A1 | 9/2002 | Malone |
| 2002/0142839 A1 | 10/2002 | Wolinsky |
| 2002/0147046 A1 | 10/2002 | Wang |
| 2002/0160824 A1 | 10/2002 | Goto et al. |
| 2003/0050118 A1 | 3/2003 | Suzuki et al. |
| 2003/0073472 A1 | 4/2003 | Varley |
| 2003/0074665 A1 | 4/2003 | Varley |
| 2003/0104868 A1 | 6/2003 | Okita et al. |
| 2003/0109306 A1 | 6/2003 | Karmarkar |
| 2003/0126013 A1* | 7/2003 | Shand ................ G06Q 30/02 705/14.52 |
| 2003/0130039 A1 | 7/2003 | Nelson |
| 2003/0168803 A1 | 9/2003 | Larkin |
| 2003/0199308 A1 | 10/2003 | Parker |
| 2003/0216185 A1 | 11/2003 | Varley |
| 2003/0217135 A1 | 11/2003 | Chatani et al. |
| 2004/0068738 A1 | 4/2004 | Kinoshita |
| 2004/0077400 A1 | 4/2004 | Marshall |
| 2004/0152508 A1 | 8/2004 | Lind et al. |
| 2004/0224746 A1 | 11/2004 | Fong |
| 2004/0229687 A1 | 11/2004 | Miyamoto et al. |
| 2004/0235568 A1 | 11/2004 | Kim |
| 2005/0026670 A1 | 2/2005 | Lardie |
| 2005/0101382 A1 | 5/2005 | Hattori |
| 2005/0204381 A1 | 9/2005 | Ludvig et al. |
| 2005/0208991 A1 | 9/2005 | Luciano et al. |
| 2005/0227764 A1 | 10/2005 | Cantu et al. |
| 2005/0272503 A1 | 12/2005 | Thoresson |
| 2006/0003824 A1* | 1/2006 | Kobayashi .......... A63F 13/12 463/1 |
| 2006/0017227 A1 | 1/2006 | Falciglia |
| 2006/0040727 A1 | 2/2006 | Lind et al. |
| 2006/0068917 A1* | 3/2006 | Snoddy ................ A63F 13/24 463/42 |
| 2006/0073471 A1 | 4/2006 | Bango et al. |
| 2006/0079330 A1 | 4/2006 | Dvorak et al. |
| 2006/0084504 A1 | 4/2006 | Chan et al. |
| 2006/0166731 A1 | 7/2006 | Yoshimi et al. |
| 2007/0004506 A1 | 1/2007 | Kinsley et al. |
| 2007/0117635 A1 | 5/2007 | Spanton et al. |
| 2007/0136745 A1 | 6/2007 | Garbow et al. |
| 2007/0211703 A1 | 9/2007 | Gu et al. |
| 2007/0270206 A1 | 11/2007 | Snoddy et al. |

(56) References Cited

U.S. PATENT DOCUMENTS

| | | | |
|---|---|---|---|
| 2007/0293290 A1 | 12/2007 | McNally | |
| 2007/0294096 A1* | 12/2007 | Randall | G06Q 30/0267 705/1.1 |
| 2008/0020845 A1 | 1/2008 | Low et al. | |
| 2008/0054561 A1 | 3/2008 | Canterbury et al. | |
| 2008/0076506 A1 | 3/2008 | Nguyen et al. | |
| 2008/0091777 A1 | 4/2008 | Carlos | |
| 2008/0103900 A1 | 5/2008 | Flake et al. | |
| 2008/0194310 A1* | 8/2008 | Yoshizawa | G07F 17/3211 463/16 |
| 2008/0232219 A1* | 9/2008 | Sharma | G06K 9/00973 369/85 |
| 2008/0276157 A1* | 11/2008 | Kustka | G06F 9/54 715/201 |
| 2008/0304641 A1* | 12/2008 | Rowe | H04M 11/04 379/111 |
| 2009/0048930 A1 | 2/2009 | Taylor | |
| 2009/0062004 A1 | 3/2009 | Vedurmudi | |
| 2009/0069081 A1 | 3/2009 | Thorner | |
| 2009/0070186 A1 | 3/2009 | Buiten et al. | |
| 2009/0104990 A1 | 4/2009 | Tsujino et al. | |
| 2009/0181720 A1 | 7/2009 | Marsico | |
| 2009/0197681 A1 | 8/2009 | Krishnamoorthy et al. | |
| 2010/0005394 A1* | 1/2010 | Dubnov | G06F 16/435 715/733 |
| 2010/0041479 A1 | 2/2010 | Hsu | |
| 2010/0113148 A1 | 5/2010 | Haltovsky et al. | |
| 2010/0197380 A1 | 8/2010 | Shackleton | |
| 2010/0267448 A1* | 10/2010 | Snoddy | A63F 13/22 463/30 |
| 2011/0070940 A1* | 3/2011 | Jaffe | G07F 17/32 463/20 |
| 2011/0105226 A1 | 5/2011 | Perlman | |
| 2011/0123062 A1* | 5/2011 | Hilu | G06Q 30/02 382/100 |
| 2011/0145073 A1* | 6/2011 | Richman | G06Q 30/02 705/14.66 |
| 2011/0193780 A1 | 8/2011 | Schaaf | |
| 2011/0199304 A1 | 8/2011 | Walley et al. | |
| 2011/0283354 A1 | 11/2011 | Chang et al. | |
| 2011/0300930 A1 | 12/2011 | Hsu | |
| 2012/0014558 A1 | 1/2012 | Stafford et al. | |
| 2012/0084364 A1 | 4/2012 | Sivavakeesar | |
| 2012/0249466 A1 | 10/2012 | Ito et al. | |
| 2012/0283018 A1 | 11/2012 | Berner et al. | |
| 2013/0184071 A1 | 7/2013 | Gadher et al. | |
| 2014/0040765 A1 | 2/2014 | Fung et al. | |
| 2016/0136521 A1 | 5/2016 | Doorgeest | |

FOREIGN PATENT DOCUMENTS

| | | |
|---|---|---|
| CN | 101106560 A | 1/2008 |
| CN | 101108276 A | 1/2008 |
| CN | 101119782 A | 2/2008 |
| CN | 101163526 A | 4/2008 |
| CN | 101622041 A | 1/2010 |
| CN | 102125759 A | 7/2011 |
| CN | 103535008 A | 1/2014 |
| DE | 4221118 A1 | 1/1994 |
| EP | 0479742 A1 | 4/1992 |
| EP | 0631247 A2 | 12/1994 |
| EP | 0277014 A2 | 8/1998 |
| GB | 2404872 A | 2/2005 |
| JP | 06285259 A | 10/1994 |
| JP | 2001190850 A | 7/2001 |
| JP | 2002066144 A | 3/2002 |
| JP | 2003117246 A | 4/2003 |
| JP | 2003135857 A | 5/2003 |
| JP | 2005279134 A | 10/2005 |
| JP | 2006014956 A | 1/2006 |
| JP | 2007098105 A | 4/2007 |
| JP | 2007160000 A | 6/2007 |
| JP | 2008513167 A | 5/2008 |
| JP | 2008544380 A | 12/2008 |
| JP | 2009061277 A | 3/2009 |
| JP | 2010532050 A | 9/2010 |
| JP | 2011135525 A | 7/2011 |
| WO | 9208531 A1 | 5/1992 |
| WO | 1993016776 A1 | 9/1993 |
| WO | 1997018370 A2 | 5/1997 |
| WO | 9821682 A1 | 5/1998 |
| WO | 0072930 A1 | 12/2000 |
| WO | 93027970 A2 | 4/2003 |
| WO | 2004004857 A1 | 1/2004 |
| WO | 2006058408 A1 | 6/2006 |
| WO | 2011056264 A1 | 5/2011 |
| WO | 2011096204 A1 | 8/2011 |
| WO | 2012103636 A1 | 8/2012 |

OTHER PUBLICATIONS

Document relating to PCT Application No. PCT/CA2012/000938, dated Feb. 6, 2013 (Written Opinion).

Document relating to PCT Application No. PCT/CA2012/000938, dated Feb. 6, 2013 (International Search Report).

Document relating to PCT Application No. PCT/CA2012/000938, dated Apr. 15, 2014 (International Preliminary Report an Patentability).

Document relating to PCT Application No. PCT/CA2012/000087, dated Apr. 23, 2012 (Written Opinion).

Document relating to PCT Application No. PCT/CA2012/000087, dated Apr. 23, 2012 (International Search Report).

Document relating to PCT Application No. PCT/CA2012/000087, dated Aug. 6, 2013 (International Preliminary Report an Patentability).

Scarne, John: "Scarne's Complete Guide to Gambling", Simon and Schuster, New York, 1961, Chapter 8 (22 pages).

www.timeplay.com, Interactive Games: Games of Chance, Nov. 29, 2006 (Nov. 29, 2006), 5 pages.

Heisler. "Fun Pad Mixes Entertainment and Advertising." Advertising Age; May 31, 1999.

"Game Boy Battery Pack/AC Adaptor." http:www.gamersgraveyard.com/repository/gameboy/peripherals/batterypack.html. 1991.

Stack "Interactive—Ride' is Here—Run for Your Life." San Francisco Chronicle, May 6, 1995.

Rosenburg "'Ride for Your Life'—really." San Franciscvo Chronicle, May 5, 1995.

"Ride for Your Life." Boxoffice Magazine, obtained May 10, 2006 from http://www.boxoffice.com/bxoser/getreview.asp?where=ID&terms=3419.

Wagner, "New Technology exploits kids in Ride for Your Life." The Tech, May 5, 1995.

"Free Bingo—Online Bingo Games," accessed at www.bingo.com, as early as May 11, 2006.

"Trivia Bingo Gameshow Concept," accessed at www.firstbingo.com/game_concept.html, as early as May 11, 2006.

"Bingo Hall," accessed at www.bingohall.com, as early as May 11, 2006.

Kong Xiangwei, "Search Report and Office Action", issued in related CN Application No. 201610849278.5, National Intellectual Property Administration, P. R. China, dated Feb. 4, 2021—English Translation, 13 pages.

Martin Bueno, "Extended European Search Report", issued in related European Application No. 20204243.8, European Patent Office, Munich, Germany, dated Apr. 4, 2021, 12 pages.

* cited by examiner

SYSTEMS AND METHODS FOR INTERACTIVE EXPERIENCES AND CONTROLLERS THEREFOR

CROSS REFERENCE TO RELATED APPLICATIONS

This application is a Continuation of U.S. patent application Ser. No. 13/955,678 filed on Jul. 31, 2013, which is a continuation of International Application No. PCT/CA2012/000087 filed Feb. 1, 2012, which claims the benefit of U.S. Provisional application 61/438,358, filed on Feb. 1, 2011 and U.S. Provisional application 61/472,709 filed on Apr. 7, 2011, all of which are incorporated herein by reference.

FIELD

The described embodiments relate to systems for coordinating and synchronizing interactive experiences shared between participants located at one or more locations. Some of the described embodiments relate to user interfaces for interactive experiences.

BACKGROUND

Gaming, educational and other shared experiences are increasingly delivered to people through networked computer systems. Some existing systems allow participants in shared experiences to simultaneously observe common information and other graphical elements at different locations simultaneously. Other systems allow the delivery of survey questions and other simple interactive elements in a shared experience. However, these elements are typically delivered to all participants identically. In some systems, participants may be able to make simple inputs to the system based on the common display shown to all participants. The individual inputs from different participants are processed by the system and some rudimentary confirmation or response to the individual inputs may be provided, typically on the shared common display. However, these systems do not provide a customized experience for individual participants incorporating personalized displays and information for different participants. Furthermore, these systems typically allow only a small number of participants to use the system at a location, typically in the range of 10 or fewer participants.

Accordingly, there is a need for systems and methods that allow an interactive experience to be shared among participants located in one or more places, while allowing the participants to participate in a personalized or customized manner. For example, there is a need for gaming systems that allow players to access a customized display of personal or private information or use personal input devices to participate in the otherwise shared experience. In addition, there is a need for systems and methods that provide a customized or individualized experience for the participants as they participate in the interactive experience.

SUMMARY

In a first aspect, some embodiments according to the invention provide a system with a plurality of nodes. The system includes a coordination node and a plurality of interactive nodes. Each interactive node is at a venue, which may be a public venue, a private venue or an individual venue. At each node, participants in interactive experiences provided by the system are able to view a main or shared display and a personal or private display. The main display at each interactive node contains information that is shared between some or all of the participants at the various interactive nodes. Each participant's personal display includes information that is specific to the participant and may also include other information, including information that is also displayed on a main display or on other participant's personal displays.

Some of the interactive nodes may include a local controller that communicates with the coordination node and one or more participant devices that communicate with the local controller. The local controller controls the main display at each such node. The local controller provides an interface between the participant devices and the coordination node.

Some interactive nodes may include special purpose local controller that is intended primarily or solely for use within the system. For example, an interactive node at a public venue or location may include a purpose built local controller designed to communicate with a plurality of differing participant devices that include a screen on which the personal display may be shown. The participant devices may communicate with the local controller using a proprietary or non-proprietary protocol, or both.

Other interactive nodes may use a multi-purpose local controller, such as a gaming console, television adapter, television or satellite set-top-box, computer or any other processing device. Such a local controller may communicate with participant devices including differing participant devices and potentially including purpose built participant devices that communicate with the local controller using a proprietary or nonproprietary protocol or both.

Some interactive nodes are individual nodes in which a participant uses a single personal device that acts as both a local controller and as a participant device. A main display and a personal display are shown to the participant. In various embodiments, the main display and the personal display may be shown simultaneously or alternatively.

In some embodiments, some or all of the local controllers may be virtual local controllers that are instantiated at an interactive node or at a different location that is accessible to participant devices at the interactive node through a communication network. For example, the virtual local controller an interactive node may be an instance of a software object, computer program or a computer program product that is installed and operated on a computing device that is accessible to participant devices at the interactive node. The virtual local controller may operate on a computing device that is at a location remote from the venue of the interactive node, but which is accessible to participant devices at the interactive node through a network. In some embodiments, the virtual local controller may operate on a computing device at the location of the central coordination node. In some embodiments, the virtual local controller may operate on the same computer device or computing system and the central coordination node of the system. In some embodiments, the virtual local controller may effectively be integrated with the coordination node such that there is no independent local controller, but rather a coordination node that communicates with a plurality of participant devices and also coordinates and synchronizes an interactive experience shared by participants using the participant devices.

Any particular embodiment may include one or more interactive nodes. The various interactive nodes may have the same configuration or may have different configurations.

The participants participate in a shared interactive experience that is coordinated for the participants by the system. The participant devices, local controllers and coordination node communicate through the exchange of messages. The messages include program update messages that provide information relating to participant inputs and updates describing changes in the state of the interactive experience. The messages synchronize the interactive experience allowing the actions of one participant to affect the experience of other participants.

In some embodiments, the actions of a participant may not affect the experience directly, but may be taken into account by the system in delivering a personalized experience to each participant.

In another aspect, there are provided one or more configurable controller that may be used for interactive experiences. Each controller includes one or more controller interfaces that may be suitable for use with a variety of participant devices. Each controller interface may be adapted for use with the particular input devices, sensors and other features and characteristics of a particular type of device. The controller also includes one or more configuration files that may be used to configure a controller interface to operate in a particular manner, which may be suitable for use with one or more interactive experiences. Some configuration files may include a plurality of configurations that may be used during different parts of an interactive experience. Some controllers may be configured to allow a participant to personalize or customize a controller interface for the participant's use during an interactive experience.

In some embodiments, multiple controllers may be operable on a participant device simultaneously and a participant may be provided with inputs to select between controllers. These and other aspects are further identified and described below.

BRIEF DESCRIPTION OF THE DRAWINGS

Various embodiments of the present invention will now be described with reference to the drawings, in which.

Figure 1:
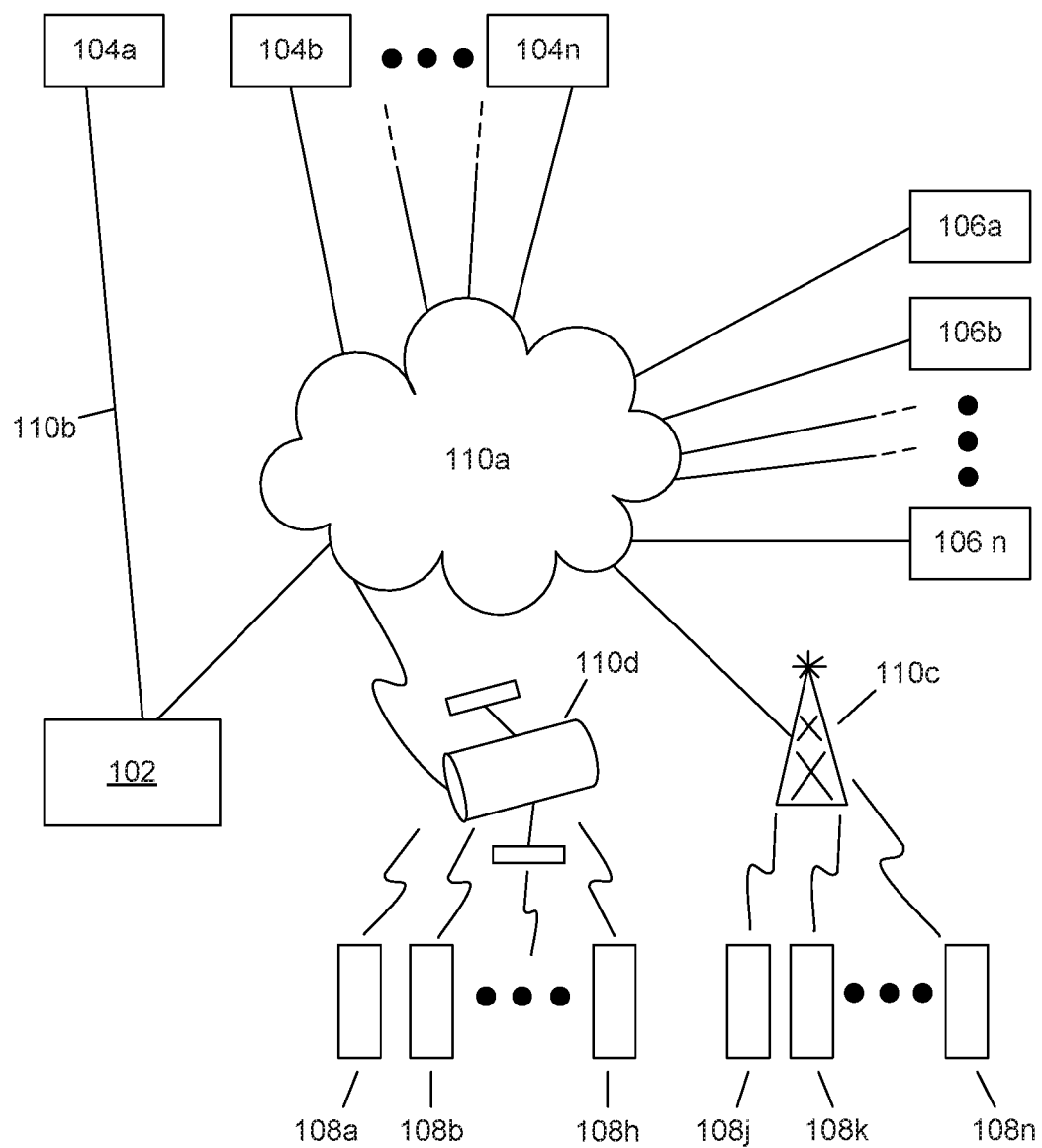
FIG. 1 illustrates a first multiple location interaction system.

DESCRIPTION OF EXEMPLARY
EMBODIMENTS

It will be appreciated that numerous specific details are set forth in order to provide an understanding of the exemplary embodiments described herein. However, it will be understood by those of ordinary skill in the art that the embodiments described herein may be practiced without these specific details. In some instances, well-known methods, procedures and components have not been described in detail so as not to obscure the embodiments described herein. Furthermore, this description is not to be considered as limiting the scope of the embodiments described herein in any way, but rather as merely describing the implementation of several example embodiments.

The embodiments of the systems and methods described herein, and their component nodes, devices and system, may be implemented in hardware or software, or a combination of both. However, preferably, these embodiments are implemented in computer programs executing on programmable computers each comprising at least one processor, a data storage system (including volatile and non-volatile memory and/or storage elements), at least one input device, and at least one output device.

For example and without limitation, the various programmable computers may be a personal computer, laptop, tablet, personal data assistant, cellular telephone, smartphone device, UMPC tablets and wireless hypermedia device or any other data processing or computing device. Program code is applied to input data to perform the functions described herein and generate output information. The output information is applied to one or more output devices, in known fashion.

Each program is preferably implemented in a high level procedural or object oriented programming and/or scripting language such as Flash or Java, for example, to communicate with a computer system. However, the programs can be implemented in assembly or machine language, if desired. In any case, the language may be a compiled or interpreted language. Each such computer program is preferably stored on a non-transitory storage media or a device (e.g. ROM or magnetic diskette) readable by or accessible to a general or special purpose programmable computer, for configuring and operating the computer when the storage media or device is read by the computer to perform the procedures described herein. In various embodiments, the computer program may be stored locally or at a location distant from the computer in non-transitory storage media. In some embodiments, the computer program may be stored on a device accessible through a local area network (LAN) or a wide area network such as the Internet. The subject system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, network based storage and the like. The computer useable instructions may also be in various forms, including compiled and non-compiled code.

Reference is first made to FIG. 1, which illustrates a multiple location interaction system 100. Interaction system 100 includes a coordination node 102, a plurality of public multi-participant interactive nodes 104, a plurality of private multi-participant interactive nodes 106, and a plurality of individual interactive nodes 108. Each interactive node 104, 106, 108 in system 100 communicates with coordination node 102 through network 110, which may include any type of communication network or network components, such as wide area network 110a such as the Internet, a direct point-to-point connection 110b, a cellular communications network 110c, a satellite based communication network 110d, a local area network or any other type of communication network or system. In some embodiments, some of the interactive nodes may communicate directly between themselves through network 110.

Figure 2:
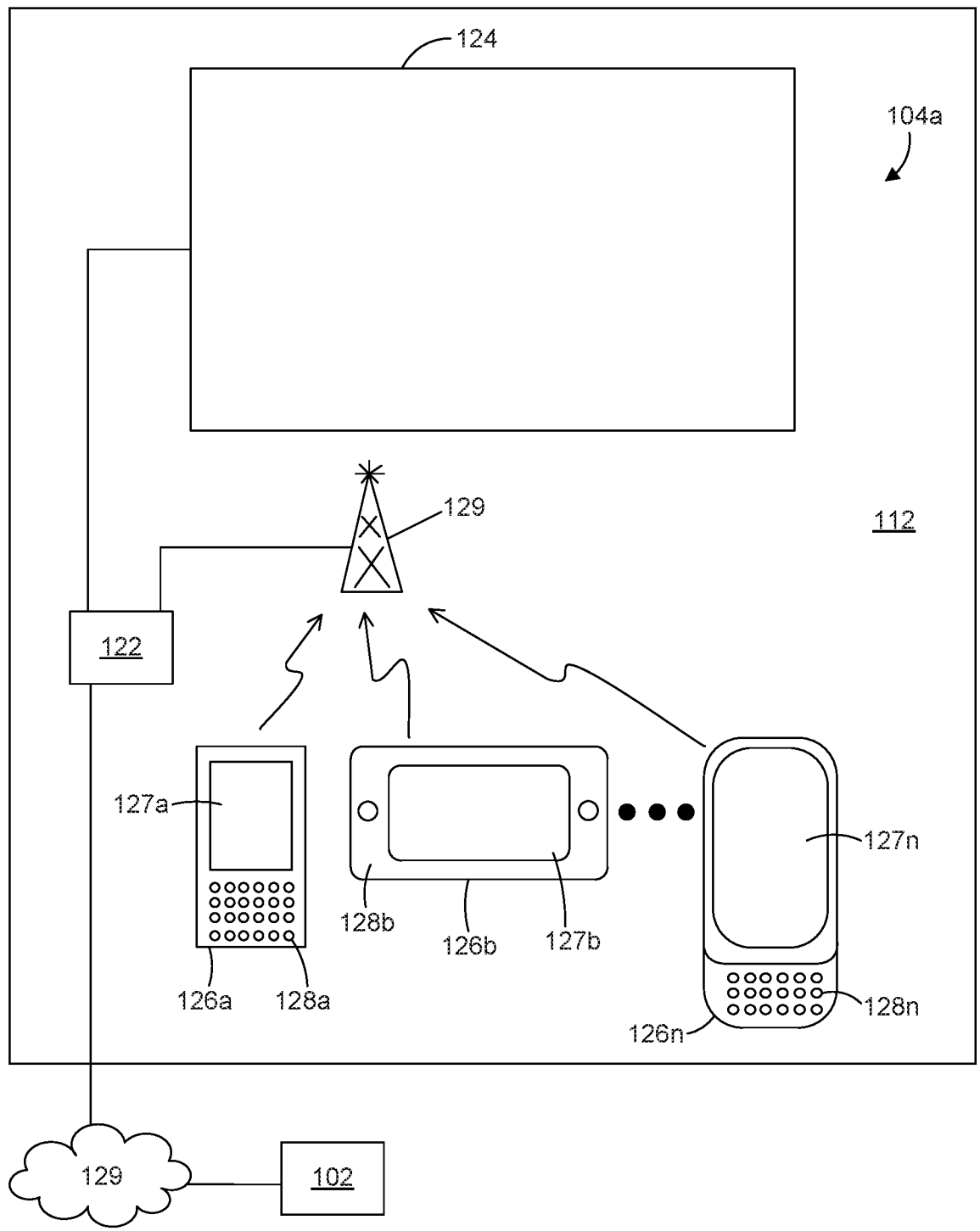
FIG. 2 illustrates a public multi-participant interactive node.

Reference is next made to FIG. 2, which illustrates public multi-participant interactive node 104a. A multi-participant interactive node 104 may also be referred to as a public node. Public node 104a is located in a public location or venue 112. Public node 104a includes a local controller 122, a primary display screen 124 and a plurality of participant devices 126. Local controller 122 is coupled to coordination node 102 directly or indirectly through network 110. A local network 129 is available at public location 112. In this embodiment, local network 129 is a wireless network such as a Wi-Fi network, a Bluetooth network or any other type of communication network or system.

Typically, each participant device 126 will be a portable wireless computing device. Each participant device 126 includes a secondary display screen 127 and one or more input devices 128 such as a keypad, keyboard, touchscreen, button, scroll wheel, scroll ball, gyroscope, accelerometer, compass, level, orientation sensor or a combination of such devices. Each participant device 126 is coupled to local controller 122 through local network 129. The participant devices 126 may be different devices, such as various multi-purpose devices such as smartphones, cell phones or other portable computing devices, which are typically coupled to the local controller through wireless communication components of local network 129.

In other embodiments, the participant devices may be wired devices that are physically coupled to the local controller 122 through wired communication components of local network 129. Some participant devices may be mounted in a fixed position or fastened to a fixed location in the public location. For example, some participant devices may be secured to a seat or table to prevent theft of the participant devices. Such physically anchored or tethered participant devices may be coupled to the local controller through wired or wireless communication components of local network 129.

Primary display screen 124 is also coupled to local controller 122, which controls the display of data on the primary display screen 124. The primary display screen 124 is used to present a main display of information to all participants and to observers present in the public location. Local controller 122 is configured to control the display of information on the primary display screen 124 and on each of the participant devices 126. In some embodiments, there may be two or more primary screen positioned to allow participants and other persons in the venue to view one or more of the primary screens. Identical or similar main displays will typically be shown on all of the primary displays.

As used herein, the term "coupled" means that two or more devices are able to communicate such that data and other information can be transmitted between them. The coupling may be a physical coupling through cables, communications networks and devices or other devices. The coupling may also be a wireless coupling through a wireless communication protocol or a network. The coupling may also incorporate both physical and wireless couplings.

Public location 112 may be any location in which a plurality of members of the public may be present and view the primary display screen 124 such as a movie theatre, sporting facility, bar, restaurant or any other location in which a primary display may be visible to members of the public. Local controller 122 may be part of one or more public nodes 104 at a public location 112. For example, if the public location is a movie theatre having multiple auditoriums, some or all of the individual auditoriums may have a public node. The movie screen at the front of the auditorium is used as a primary display screen and individual movie viewers may use participant devices to view individual information on a secondary screen to provide inputs. A public node is provided in each auditorium. The local controller for the various public nodes in the various auditoriums may be shared between two or more public nodes.

Figure 3:
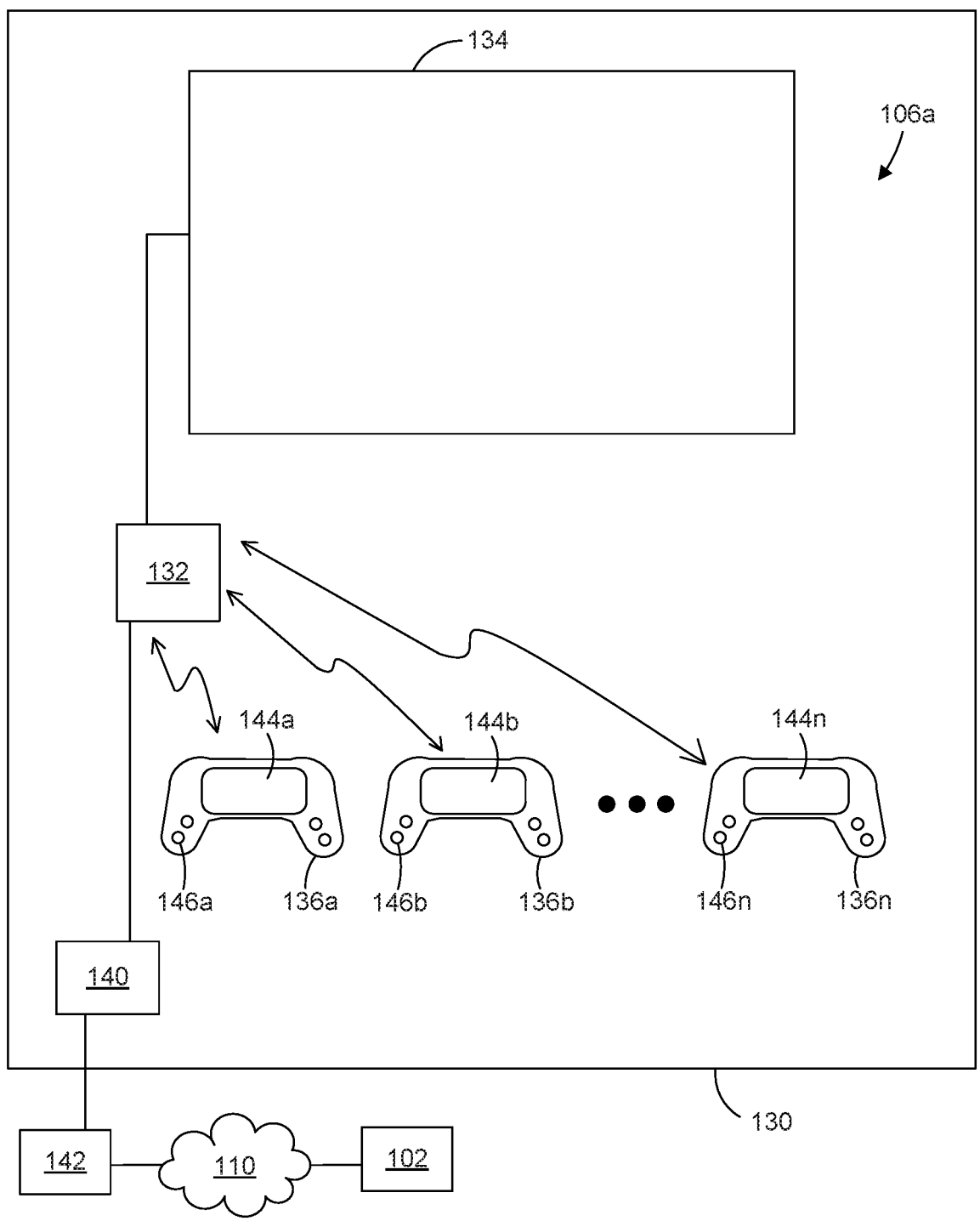
FIG. 3 illustrates a private multi-participant interactive node.

Reference is next made to FIG. 3, which illustrates a private multi-participant interactive node 106a, which may also be referred to as a private node. Private 106a is located in a private location 130, such as a private home. Private node 106a includes a local controller 132, a primary display screen 134 coupled to the local controller 132 and a plurality of participant devices 136.

Local controller 132 is coupled to coordination node 102 through a local private location network 140, which, in this embodiment, is a wireless network, and through an ISP network 142 and network 110. ISP network 142 provides Internet access to devices such as the local controller 132 located at the private location 130. In other embodiments, the local controller 132 may be coupled to coordination node 102 through a wired coupling or through any other means for coupling computing devices.

Local controller 132 is also coupled to the participant devices 136. In a private node 106, the local controller 132 and the participant devices 136 may be designed specifically to interoperate with one another. For example, the local controller 132 may be a gaming console and the participant devices may be game controllers for use with the gaming console. For example, the local controller may be a Sony Playstation 3™, a Nintendo Wii™, a Microsoft XBOX 360™ or another such device or console such as a set-top television or satellite communication box or a computer. In other embodiments, the controller may be integrated into a display device such as a television or monitor or into another type of device capable of communicating with the coordination node and with the participant devices. For example, in some embodiments, the local controller may be an Internet television or video service device such as an Apple TV™ and the participant devices may be devices capable of communicating with the television or video service devices such as Apple iPhones™, iPods™ or iPads™.

Each of the gaming consoles or devices is capable of communicating with and receiving inputs from participant devices, which may be game controllers, designed for communication with the respective console or device. Each participant device 136, according to this embodiment, has a secondary display screen 144 and one or more input devices 146. In some embodiments, the participant devices 136 in a particular private node 106 may be essentially identical in construction. That is, the participant devices may have the same physical structure and controls, although the local controller 132 is able to independently communicate bi-directionally with each of the participant devices. In other embodiments, the participant devices may be of different physical structures, configurations or arrangements.

Local controller 132 controls the display of a main display on the primary display screen 134 and of personal displays on the secondary display screens 144 of the participant devices.

In some embodiment, the local controller 132 may be a virtual component that resides in a network or a device that may be coupled to the coordination node 102 and to the participant devices 136. For example, the local controller 132 may be a virtual component operating on a computer at the same location as the coordination node or at another location. In some embodiments a virtual controller may be shared between different interactive nodes that are in different locations.

Figure 4:
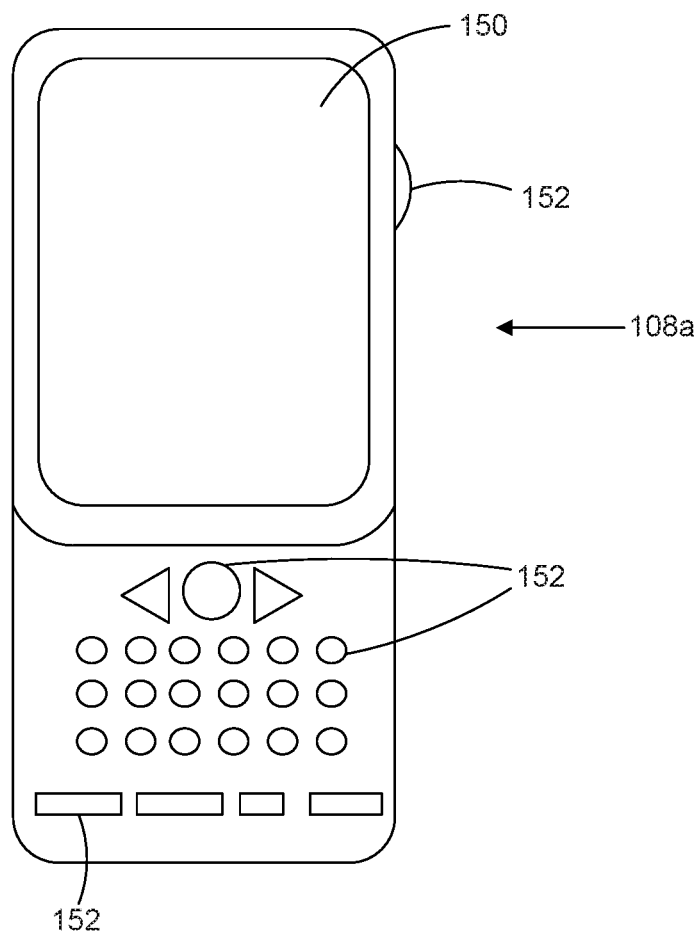
FIG. 4 illustrates an individual interactive node.
Figure 5:
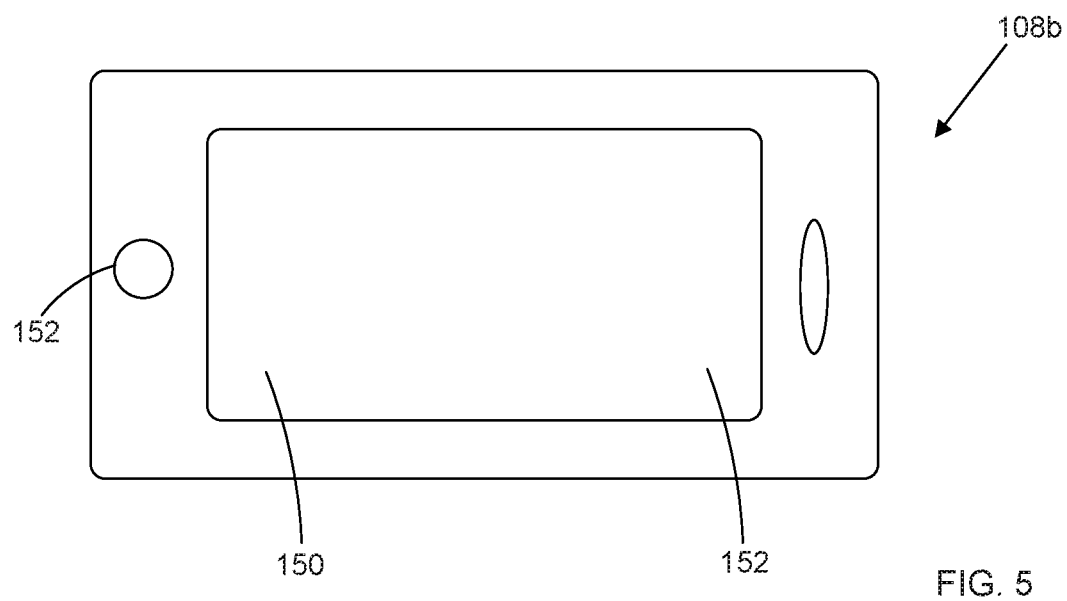
FIG. 5 illustrates a primary display.

Reference is next made to FIGS. 4 and 5, which illustrate individual interactive nodes 108a and 108b. An individual interactive node may also be referred to as an individual node. Typically, each individual node is a self contained device with a display screen 150 and one or more input devices 152. In some embodiments, some individual nodes may be multi-unit devices that are coupled together and work as an integrated unit having a display screen 150 and one or more input devices 152.

Each individual interactive node 108 is configured to operate as both a main display and as a participant device. In this specification, the term "participant device" includes an individual interactive node, unless specified otherwise, or unless dictated otherwise by the context.

The display screen 150 of an individual node 108 is used as both a primary display screen and as a secondary display screen. For some individual nodes or in some interactive experiences, this may be done by selecting a portion of the display screen 150 in which to display a main display (corresponding to the main display shown on primary display screens at public and private nodes) and a portion of the display screen 150 in which to display a private display (corresponding to the secondary display screens of participant devices used in public and private nodes). In some individual nodes or some interactive experiences, this may be done by displaying a main display on the display screen 150 at some times and a personal display on the display screen 150 at other times. A participant may be able to select between the main and personal displays. The two techniques may be combined in some individual nodes or some interactive experiences.

Individual node 108a has a variety of input devices 152 including a keypad, a control wheel, a control ball and various other buttons. Individual node 108b has several input devices 152 including a button and a touchscreen. Individual node 108b also has an orientation or tilt sensor that allows a participant to provide inputs by tilting or rotating the device and accelerometers that allow a participant to provide inputs by moving the device.

Each individual node 108 is coupled to the coordination node 102. In FIG. 4, individual node 108a is a smartphone that has wireless data service provided by a wireless communication service provider. Individual node 108a is coupled to a wireless communication network which is coupled to network 110.

The public nodes 104, private nodes 106 and individual nodes 108 may be referred to collectively as interactive nodes. In system 100, each interactive node is coupled to coordination node 102, although the communication networks and modes through which the interactive nodes are coupled to the coordination node 102 may vary.

System 100 allows participants using a variety of participant devices 126, 136, 108 to interactively participate in a shared experience. For example, system 100 may be used to allow participants to engage in a shared gaming, presentation, marketing, training, surveying or other interactive experience.

In some embodiments, system 100 is configured as a gaming system. In such configurations, a game is played by participants in at least two locations. At each location, each participant can view at least two displays: a main display that displays shared information and a personal display that includes information that is personal to the corresponding participant.

For example, the game may be a car racing game. An overhead view of a race track may be shown on the main display. Each participant controls one car that moves along the track. The participant can also view information specific to that participant's car or performance in the race on a personal device. For example, a participant's personal display may show the participant car and the track from the perspective of a driver inside the car. The participant's display is shown on a participant device, which also allows the participant to steer the car and to provide other inputs for the car racing game.

In some embodiments, system 100 may be configured as a betting or wagering system. The main display at each interactive node is used to display a video presentation such as a sporting event, a roulette wheel or a card dealer. Participants may view a variety of betting options on the personal display on their personal participant devices and may make bets on events in the video presentation. For example, participants may be able to bet on the outcome of the sporting event or events that occur during the sporting event (such as the next team to score, the next penalty, the outcome of the next play, etc.), the next number to be drawn at the roulette table, a card or hand to be dealt by the card dealer. Each participant is able to independently and privately access information about possible bets, make such bets, receive results for such. Individual betting may be reflected in updates to odds for some bets or to display bets or the outcomes of bets placed by participants.

In some embodiments, system 100 may be configured as an educational system or training system. Information may be presented to a group of participants at several locations. Each participant may view shared information presented on a main display and may also view private information on a personal display.

For example, in a training system, a series of slides may be presented to all participants on the main display that is shown to all participants. Some or all of the participants may also be presented with content specific to each respective participant on the personal display such as a series of questions that each participant must answer. The personal display may allow participants to view and answer questions at the participants own pace, or may display different questions to different participants. The personal display is shown on a participant device to each player, who may use input devices on the participant device to answer questions or otherwise interactively participate in the training session.

Figure 6:
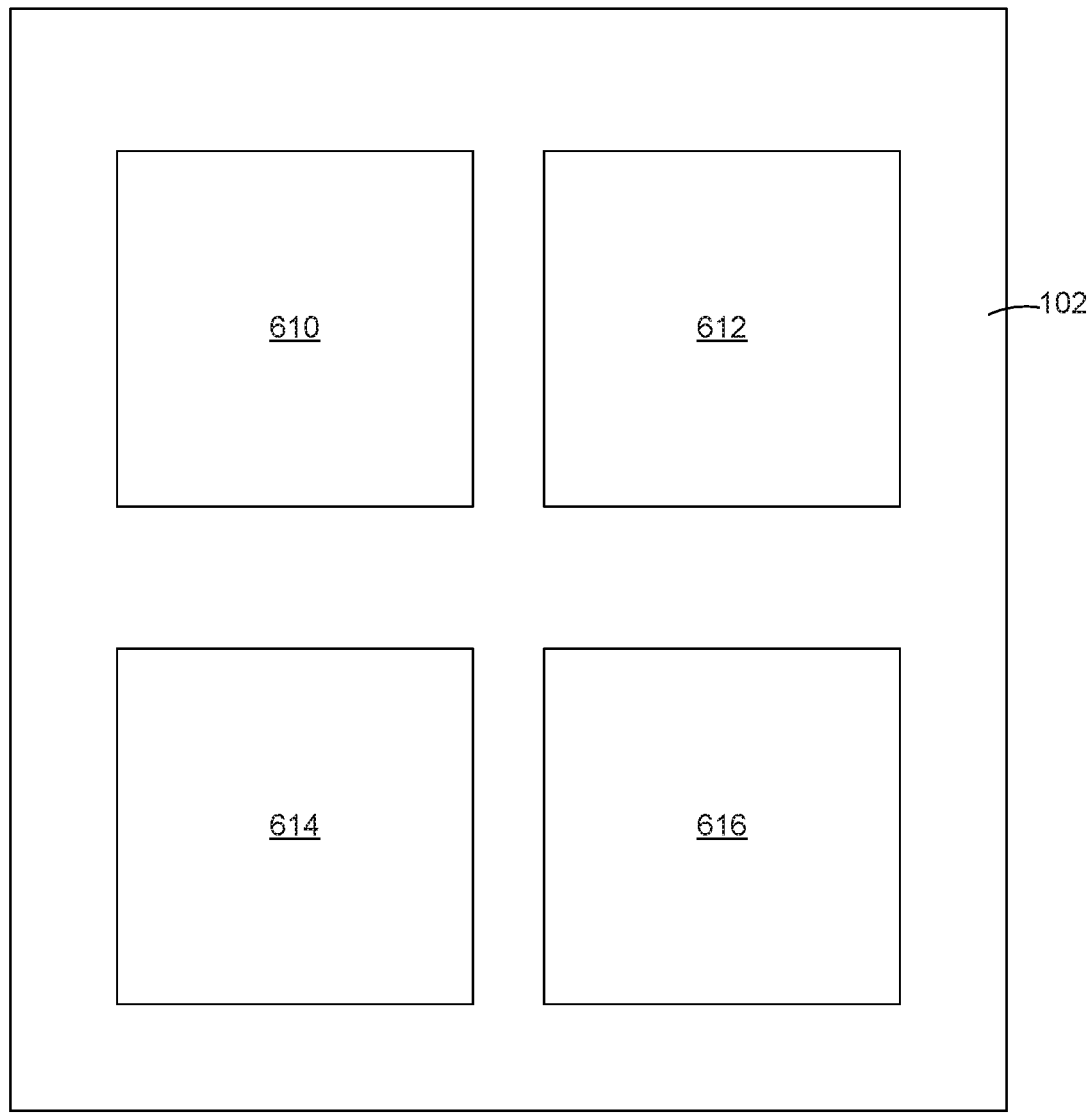
FIG. 6 illustrates a coordination node.

Reference is next made to FIG. 6, which illustrates coordination node 102. Coordination node 102 includes a program database 610, a participant database 612, one or more program control modules 614 and one or more system access applications 616.

A plurality of interactive programs are recorded in the program database 610. The interactive gaming and educational experiences described above are examples of experiences that may be provided by the interactive programs recorded in the program database 610. Each interactive program includes participant components that operate at the participant devices 126, 136 and 108 and may include central or core components that may operate at the coordination node. In addition, some interactive programs may include local controller components that operate at some or all of the local controllers of the public and private nodes. Each of the participant components, central components and local controller components are software objects or components that are executable on the respective devices on system 100.

Program control modules 614 operate within the coordination node 102 to coordinate a shared experience between participants located at various interactive nodes. Typically, each program control module 614 is a software object or component that executes on a processor within the coordination node. The processor has access to a non-transitory memory in which the program database 610, participant database 612 and system access applications 616 are recorded. One or more program control modules 614 may be active at any time to manage the operation of one or more interactive experiences.

System access applications 616 are software objects or components that are installed and operate on different participant devices. Each system access application allows a participant to use the respective participant device to view a personal display on a participant device and to provide inputs using input devices on the participant device. In some embodiments, different system access application may be provided for different participant devices or for the use of participant devices in different interactive nodes. For example, system access applications that operate on a Blackberry™ smartphone may differ from system access applications that operate on an Apple™ iPhone™ smartphone. Different system access applications may be provided for use of a particular smartphone (or other participant device) in different modes. For example, a different system access application may be operated on a participant device when the participant device is used as part of a public node 104, as part of a private node 106 or as an individual node 108. In some embodiments, a single system access application 616 may include modules and components that allow the system access application to operate in more than one mode.

A system access application 616 for use on an individual node 108 may include separate local controller software components that operate the individual node as a local controller and separate participant software components that operate the individual node as a participant device. The two distinct groups of software components may operate simultaneously and communicate with one another in the manner described herein in relation to local controller and participant devices at other interactive nodes. In other embodiments, a system access application for use at an individual node may include integrated software components that operate the individual node such that it communicates with the coordination node as a local controller and allows a participant to use the device as a participant device in an integrated manner.

The system access application 616 at an individual node 108 may produce a main display that is displayed as an alternative to or in conjunction with a personal display. The system access application may also provide control and communication services between the individual node 108 and the coordination node 102.

A plurality of participant records are stored in the participant database 612. In some embodiments, each participant that participates in an interactive experience using system 100 may be required to create an account or profile that is stored in a participant record. The participant records may include identification and authentication information; demographic and personal information about the participant; and program experience information for recording a participant's past success or progress in one or more programs.

Identification and authentication information may be used to allow a participant to securely access the participant's record.

Demographic and personal information may be used to provide personalized information to a participant. A participant may receive information on the participant's personal display based on the participant's previous performance in an interactive experience or based on the demographic or status information about the participant. For example, in an educational interactive experience directed to teaching employees about a new company initiative, various employees in various company and other locations. At each location, employees view common information on a main display. Each employee may receive customized information about the initiative in a personal display, based on the department in which the employee works.

Each program control module 614 manages one ongoing interactive experience at a time. Interactive nodes 104, 106 and 108 communicate with a program control module 614 to participate in the interactive experience. In other embodiments, a single program control module may manage more than one simultaneous ongoing interactive experience.

The operation of system 100 will now be explained with reference to an example gaming configuration of the system. The particular example is a car racing game in which individual participants at various public nodes, private node and individual nodes each control a virtual car as it moves around a track. Different cars controlled by different participants race around a track and the first participant to manoeuvre his or her virtual car around the track is the winner of the race.

Figure 7:
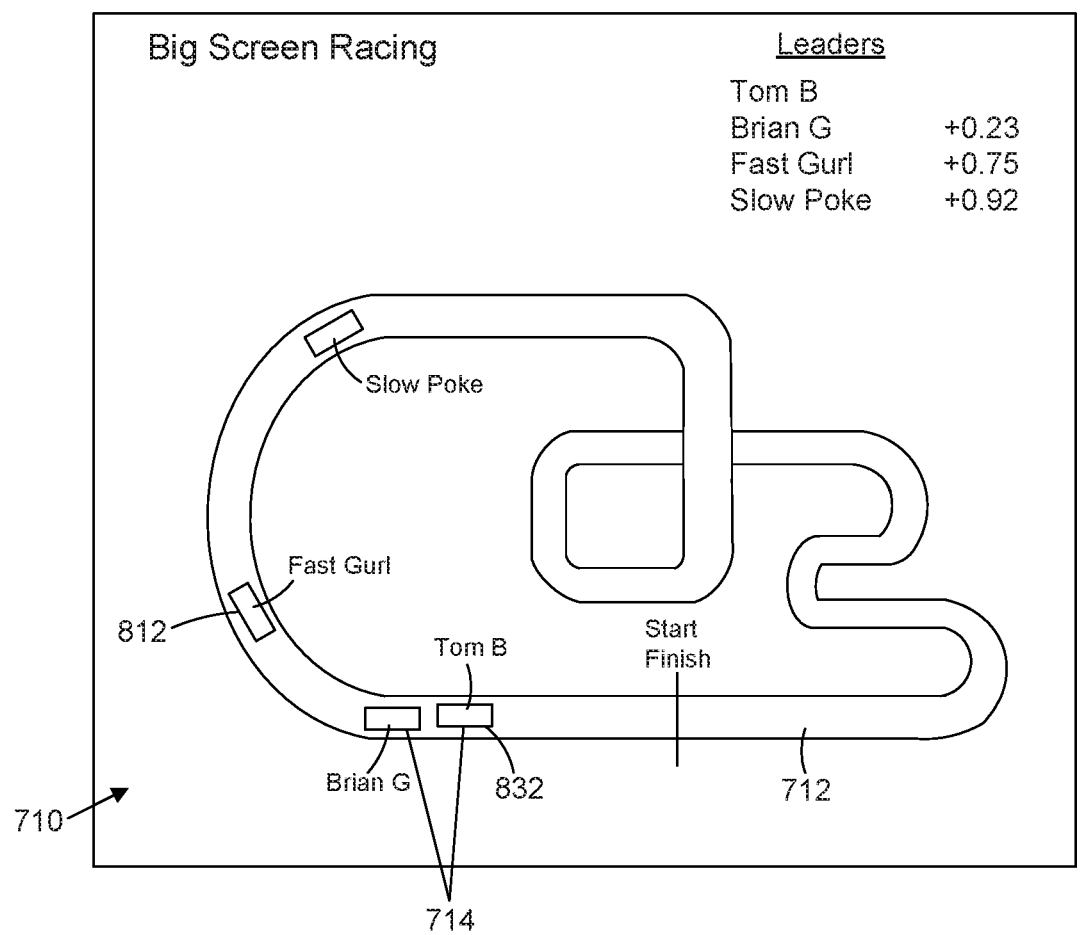
FIG. 7 illustrates a main display.

Reference is made to FIG. 7. During a multi-participant interactive experience, each player may view a main display and a personal display. Each main display at each public node or private node is shown on the primary display screen of that node. FIG. 7 illustrates an example main display 710 for the example car racing game. Main display 710 includes an overhead track display 712, a plurality of cars 714 positioned along the track and a participant list 716 identifying the order in which the participants are placed at any point during or at the end of a race. The main display may vary from one interactive node to the next. However, each main display will show at least some common information relating to the interactive experience in which the participant is engaged. For example, each main display may include the information shown in FIG. 7. Some or all of the main displays may further include information that is specific to the venue at which the respective interactive node is located. For example, if a public interactive node 104 is located in an auditorium of a movie theater, then the main display shown on the primary display screen of the node (typically the movie screen in the auditorium) the main display in the particular auditorium may include information relating to the next movie that will play in the auditorium, advertisements for concessions and services available at the movie theater, instructions for participating in an upcoming interactive experience and other information, in addition to information displayed at other interactive nodes in the system 100.

For example, in some embodiments, participants or other persons may be able to participate in a text chat, video chat or other interaction using system 100. Some components of the interaction may be displayed on the main displays shown at the interactive nodes. For example, text chat or instant messages sent by participants or other persons may be displayed. In some embodiments, text chatting or other services may be provided as a second interactive program contemporaneously with a first interactive program and components of both programs may be displayed on some or all of the main displays in the system. Participants in the respective interactive programs use their respective participant devices to participate in the respective interactive experiences.

At the same time, a main display on a private node 106 (FIG. 3) may include information relating to local controller 132 or the participant devices 136 at the particular node. For example, the main display, which is displayed on the primary screen 134 of the private node 106, may include information about the standing of each participant using the private node in the car racing game. As another example, if the participant devices are battery powered, then the strength or status of the batteries in each participant device may be displayed on the main screen.

At each individual node 108 in the system, the respective participant may also view a main display and a personal display. At some individual nodes, the participant may switch the individual node device 108 between a primary display mode in which a main display is shown and a secondary display mode in which a personal display is shown. At some individual nodes, a composite display showing both a primary display and a personal display is shown.

Figure 8A:
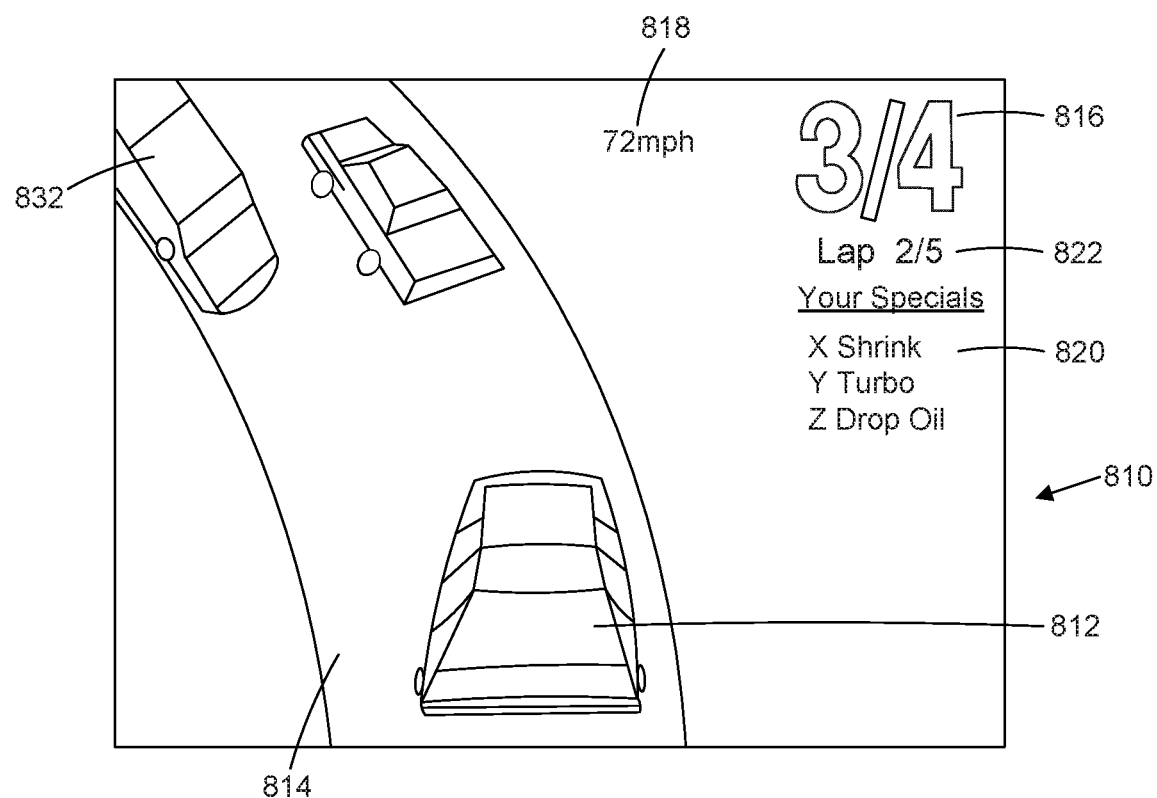
FIGS. 8a and 8b illustrate personal displays corresponding to the main display of FIG. 7.
Figure 8B:
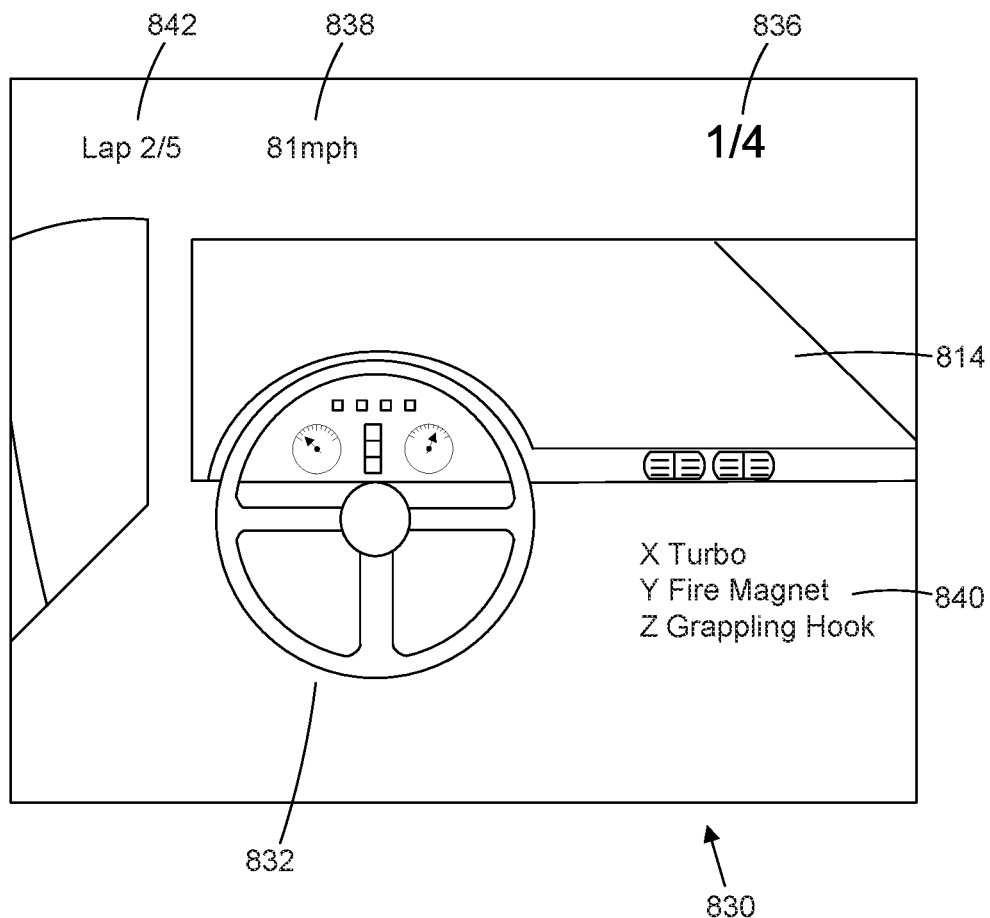

Reference is next made to FIGS. 8a and 8b. FIG. 8a illustrates a first personal display 810 for the example car racing game. Personal display 810 includes an image of a first participant's car 812 in the race, from a viewpoint situated behind the car 812. The first participant can also see the track 814 from the same perspective. The personal display 810 also includes the first participant's position 816 in the race, speed 818 and options 820 the participant may have during the race to accelerate the participant's car or to obstruct other participant's cars.

FIG. 8b shows a different personal display 830 for a second participant in the example car racing game. Personal display 830 includes an image of the second participant's car 832 from an in-car perspective. Personal display 830 also includes the track 814, the second participant's position 836 in the race, speed 838 and options 840 that the second participant has during the race.

During a multi-player interactive experience, a main display is available for viewing by all participants. The specific main display shown to a particular participant may depend on the participant's location. In the case of a participant using an individual node, the main display available to the participant may depend on the participant's device or on the participant's preferences. Such options may be provided by the participant components of an interactive program. For example, some participant components may display a main display together with a personal display on the screen of a participant device. Other participant devices may provide several configurations of a main display that may be displayed based on the participant's preferences. Similarly, local controller components at a private node may provide various alternative formats for a main display at the private node or a public node.

Figure 10:
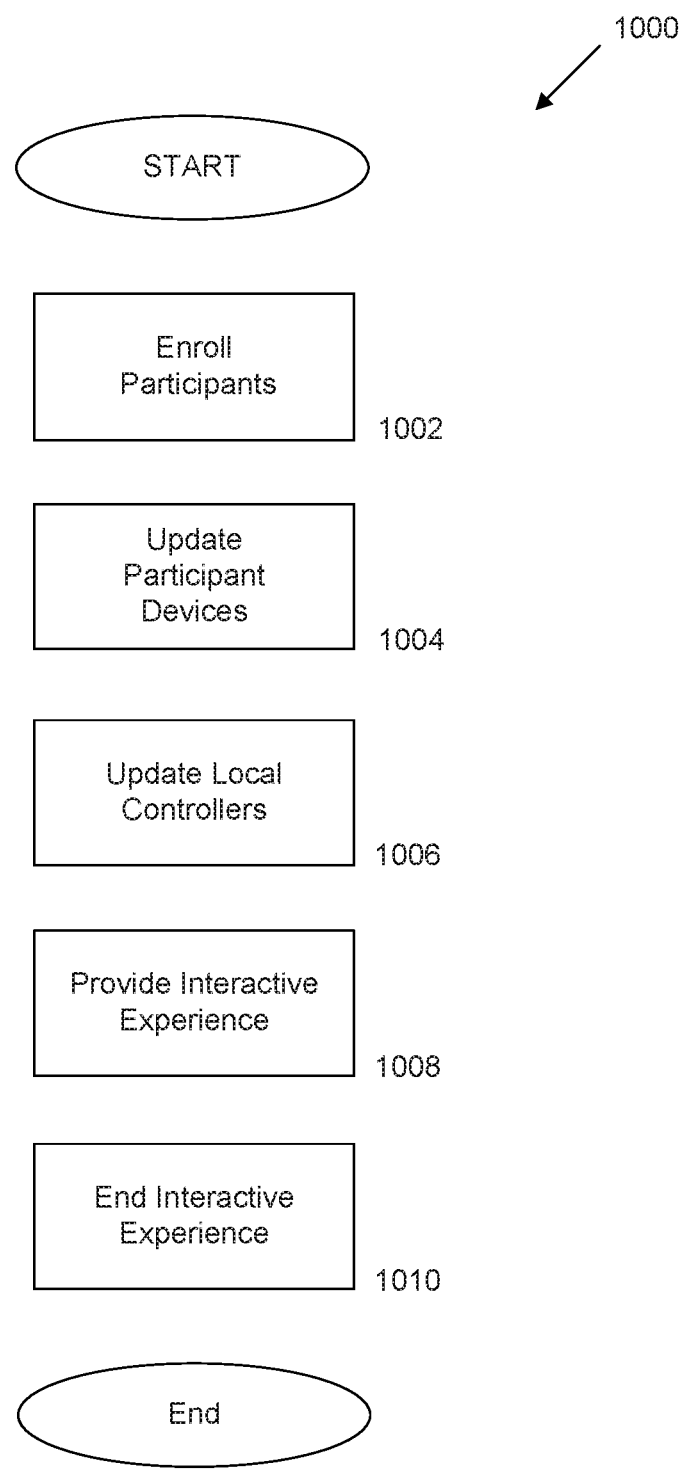
FIG. 10 illustrates a method of operating the system.

Reference is made to FIG. 10, which illustrates a method 1000 of operating system 100 to provide a shared interactive experience for participants at different interactive nodes.

Method 1000 begins in step 1002, in which a plurality of participants located at two or more locations are enrolled to participate in an interactive experience. To enroll, each participant activates a system access application 616. Participants located at a public or private node may be able to access the respective local controller 122 or 132 for the node using a participant device to download a system access application 616. For example, at a public node 104, instructions for accessing the respective local controller 122 may be displayed on the primary screen 124 of the public node. Participants may use a participant device 126 to access the local controller 122 and then download a system access application suitable for operations on the participant device.

At a private node 106, a system access application 616 suitable for use with the participant devices 136 may be pre-installed in the participant devices prior to their delivery to a retail customer. In some embodiments, a system access application 616 may be downloaded to the local controller 132 of the private node 106, and may then be installed on the participant devices from the local controller 132.

At an individual node 108, a system access application 616 may be installed on the individual node by downloading the system access application 616 from an application store or application service or from a computer or other device to which the individual node device may be coupled.

Each system access application allows a participant to communicate with the coordination node 102.

In a public node 104, the system access application 616 communicates with the coordination node 102 through the local controller 122 of the public node 104.

In this embodiment, in a private node 106, a participant device may not communicate directly with the communication node. Instead, the participant device may communicate only with the local controller 132 of the private node, which then communicates with the coordination node. In some embodiments, a public node 102 may also have this configuration.

An individual node 108 is also a participant device which communicates with coordination node 102 directly (although typically through various communication network elements).

The coordination node 102 maintains a list of currently available interactive experiences during operation of the system 100. Some interactive experiences may be available to all participants, while others are available to participants located only at certain interactive nodes or certain types of interactive nodes. For example, some interactive experiences may be designed to last a relatively long time, exceeding the short period of time that participant in a movie theatre may be waiting before the start of a movie. Such interactive experiences may not be available to participants accessing system 100 from a public node such as a movie theatre. Other participants at public nodes where patrons tend to participate in a shared experience for a longer period, such as participants accessing system 100 from a bar or other social establishment may be permitted to participate in such an interactive experience. At some interactive nodes, all participants may be required to participate in the same interactive experience. For example, at a public or private node that has only a single primary display that is used to show a main display for a single interactive experience, then all participants must participate in that interactive experience. In some embodiments a primary display may be used to show a main display for two different interactive experiences on different parts of the primary screen.

Each participant activates the respective system access application on the participant's device 126, 136 or 108. The system access application obtains a list of currently available interactive experiences from the coordination node 102, based on the interactive node from which the player has accessed the system 100. The list of available interactive experiences available to the participant is displayed on the participant's device and the participant selects one of the experiences, thereby enrolling to participate in the selected interactive experience.

In other embodiments, participants may select an interactive experience directly under the control of their respective local controllers. Interactive experiences available at each interactive node may be recorded (in real time or in advance) in the respective local controller. Participant devices communicate with the local controller to present a list of interactive experiences available to a participant, who may then choose from the list.

Method 1000 proceeds to step 1004, in which any participant components required for the interactive experience are installed on the enrolled participant's device. If the participant's device has not previously been used for the interactive experience, then any participant components necessary for the participant's device to provide the interactive experience are transmitted and installed on the participant's device. If the participant components have previously been installed on the device, then outdated components may be updated with current participant components. The particular participant components installed on a particular participant device may be dependent on the features of the participant device, the particular interactive experience for which the participant has enrolled or both. For example, if a participant device has a touchscreen, an orientation sensor, an accelerometer or other input device, then the participant components installed on the participant device may be designed to allow a participant to use such input devices. The participant components may be transmitted from the coordination node, a local controller or from an asset server coupled to the interaction system.

Method 1000 then proceeds to step 1006, in which the local controller for the interactive node at which an enrolled player will participate in an interactive experience is updated, if necessary. Some interactive programs may include local controller components that operate on the local controllers at the interactive nodes 104, 106 and 108. Typically, although not necessarily, such local controller components may differ depending on the specific type of interactive node in which they will operate. For example, local controller components for a local controller 122 in a public node 104 may be configured differently than local controller components for a local controller 132 such as a gaming console in a private node 106. Similarly, local controller components for an individual node 108 may act as both a local controller and as a participant device and are typically configured for the specific type of participant device on which they will be used.

If the local controller components have not previously been installed on the respective local controller of the interactive node from which the newly enrolled participant has accessed the system 100, then the local controller components are installed. If the local controller components have previously been installed, they may be updated to reflect any changes in the local controller components.

The local controller components for different interactive programs may vary depending on the nature of the interactive program. For example, in the car racing game described above, the local controller components may include information about the virtual tracks and virtual cars in the game. For example, the program components for the racing game may include various core components relating to the control, display and interaction of vehicles that may be used by a participant in a race. Specific details of each vehicle including specific characteristics that may be used by the core components to determine how the specific vehicle is controlled, displayed and how it interacts with other vehicles and other elements of the car racing program. If a new vehicle is added to the program, then local controller components relating to the new vehicle may be uploaded to the local controller in this step. The core components use the new vehicle specific components to display and otherwise use the new vehicle in an interactive car racing interactive experience. The local controller components may also include rules of the game and details of information message that will be exchanges between the coordination node, the local controller and the participant devices. In the case of an educational or survey interactive experience, the local controller components may include questions, slides or other information to be displayed on the main display of the interactive node or to be transmitted to and displayed on the participant devices at a local node.

Steps 1004 and 1006 allow program components for an interactive program to be updated at the local controller and participant devices. These steps are optional and may not be performed in some embodiments. For example, in some embodiments, a participant device may be updated independently of method 1000 in which a participant is able to participate in an interactive experience. Similarly, in some embodiments, local controllers may be updated during periodic updates (such as nightly or weekly updates) to add new components. In other embodiments, a limited number of interactive program components may be transmitted to a participant device during method 1000. For example, if a particular interactive program requires a graphic, computation or other asset or component, the asset may be transmitted to and installed on a participant device.

Different interactive experiences may permit or require a different number of participants to be enrolled. When an appropriate number of participants have enrolled in an interactive experience, method 1000 then proceeds to step 1008, in which the interactive experience is provided to the enrolled participants.

Figure 9:
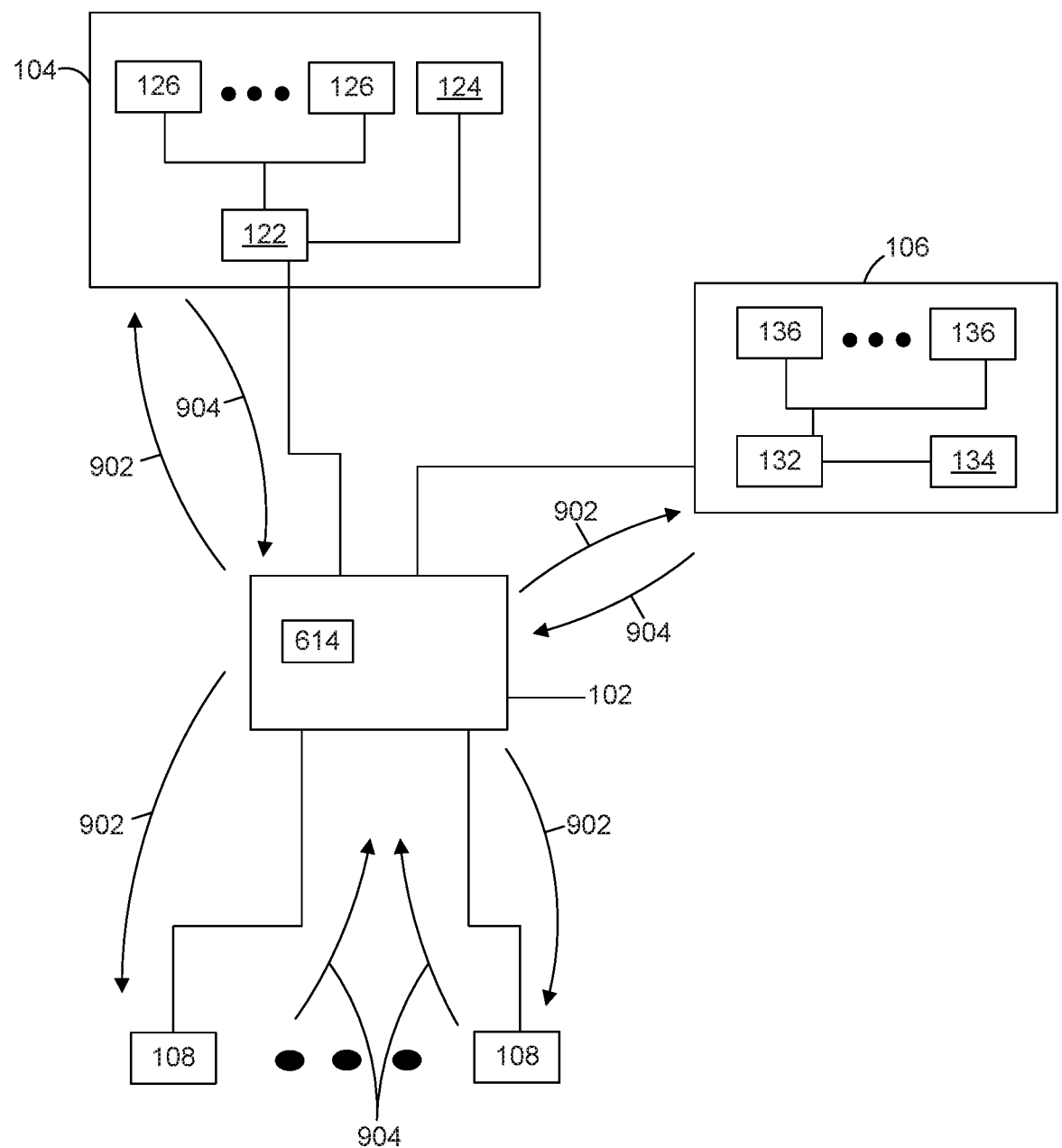
FIG. 9 illustrates messages transmitted in the system.

Reference is made to FIG. 9, which illustrates a number of messages used in system 100 to provide an interactive experience. During an interactive experience, a program control module 614 operating within coordination node 602 manages the interactive experience. Program control module 614 ensures that the shared interactive experience delivered to players at different nodes (and to different players at the same node) is synchronized such that inputs from each participant are appropriately displayed on all main displays, when such display is needed, and are taken into account into the delivery of the shared experience to other participants. Depending on the interactive experience, it may be desirable to have the results of inputs from some or all of the participants contemporaneously displayed on the main displays. For example, in a car racing interactive experience, vehicle control inputs, such as acceleration, braking and steering inputs from each player may be shown on the main displays as they are received. In a different interactive experience in which players make decisions in secret from one another, some or all of a player's input may not be reflected on the main screen until an appropriate time in the experience, or perhaps not at all.

The program control module 614 transmits program update messages 902 to each of the interactive nodes 104, 106 and 108 at which a participant in the shared experience is enrolled. The program update messages 902 may include a variety of messages including:

Main display control messages, which instruct the local controller 122, 132, 108 to update the main display of the interactive experience on the primary display 124, 134, 150 of the interactive node.

Interactive experience control messages, which indicate to the local controller or the participant devices or both when a change occurs in the interactive experience. For example, the control message may indicate when an interactive experience starts, stop or transitions from one mode to another. For example, interactive experience control messages may include the state of an interactive experience allowing the state of an experience to be shared and synchronized between interactive nodes. The local controller may update the main display of the interactive experience in the particular interactive node, transmit corresponding control messages to participant devices or respond otherwise to a control message.

Participant device messages, which the local controller re-directs in a modified or unmodified form to a specified participant device.

The program control module 614 also receives participant input messages 904 from the participant devices 126, 136 and 108. The participant input messages are generated based on inputs entered by a participant using input devices at the participant's device.

The participant components provide an interface for the participant to participate in the interactive experience. Depending on the interactive experience, the participant components may permit a participant to change the personal display shown on the secondary screen of the participant's device or to change input controls to those preferred by a participant.

For example, in the car racing game example, the participant components may provide various display perspectives or views from within, behind or ahead of the participant's car in the race. The participant may also be able to see forward ahead of or backwards behind the participant's car. Other views may include an overhead view of the participant's car. Such inputs may be processed entirely by the participant components, which may be configured to generate and provide various personal displays on the participant's devices secondary display.

Other participant inputs may affect the shared interactive experience for other players. For example, some participant inputs may relate to the direction (i.e. a steering input) or speed (i.e. an accelerator input or a braking input). Such inputs affect the position of participant's car in the race. The participant components may process such inputs to modify the personal display on the participant's device. For example, the speed of the virtual car may be updated on the personal display by the participant components. Such inputs, or a variant of such inputs, are transmitted in participant input messages 904 to the local controller 122 or 132. The local controller may also process the participant inputs. For example, the local controller may modify the main display shown on the primary display at the interactive node. The local controller then transmits the participant input message 904 (or a copy or variant) of it to the corresponding program control module 614 in the coordination node 102.

At the coordination node, the program control module 614 receives the participant input message 904, determines the effect of the participant input on the shared interactive experience and takes one or more responsive actions. Such actions may include updating a player profile of the participant from whose participant device the participant input message originated, updating interactive experience information recorded by the program control module to record the state of the interactive experience or generating one or more program update messages 902 that are then sent to local controllers, or a combination of these actions. If the participant input message 904 is not relevant to the interactive experience (for example, where the message is received after the interactive experience has terminated), program control module may discard the participant input message 904.

The program control module may process and react to a program update message 902 from a participant device in various manners, including:—If the participant input affects the main display of the interactive experience at various interactive nodes, the program control module 614 determines the modification required to the main display and transmits a main display control message to the local controller at each interactive node identifying the modification. In various embodiments, the main display control message may identify all of the content of the main display, may identify only components that are to be changed in the main display, or may provide information that allows the local controller at the respective interactive nodes to generate a main display. —If the participant input affects another participant's interactive experience, the program control module 614 transmits a participant device message to the local controller of the interactive node at which the other participant is accessing system 100. The local controller passes the participant device message to the appropriate participant device. The participant device message may provide various types of information to a participant device:

Personal display information that is used by the participant components of the interactive program to render the personal display on the secondary display of the participant's device. Such information may include details of other participant's participation in the interactive experience. In the car racing example, this may information may include the position, velocity and acceleration of other participant's cars in the car race, allowing the participant components on the participant's device to render a personal display taking such information into account.

Participant option information, which identifies options that be available to a participant. For example, in the car racing or other gaming interactive experience, if a player completes a milestone in an interactive experience, the player may become entitled to access now options or features in the interactive experience.

An interactive experience is provided to participants primarily in step 1008. Typically, an interactive program ends if certain end-of-experience conditions are met. For example, in a gaming interactive experience, the game may end if a participant or team of participants wins the game, if a selected time period expires or if another end 10 of-experience condition is met. In the case of a survey, educational or other interactive experience in which different participants are viewing a common main screen and independently answering questions or concurrently on a personal display, the experience may end when the participants have answered all of the questions, at the end of a program displayed on the main screen, after a selected time period, when a selected percentage or number of participants have completed a selected percentage or number of questions or other activities. In the case of a betting interactive experience in which the participants are viewing a video program on the common main display and concurrently placing bets based on events shown in the video program, the interactive experience may end when the video program ends.

When the end-of-experience conditions are met, method 1000 proceeds to step 1010. In step 1010, program control module 614 transmits a program update message to all local controllers and to each individual node indicating that the interactive experience is ended. The local controllers transmit a corresponding program update message to each participant device at each public and private node.

The local controller may update the main display to reflect an outcome of the interactive experience. For example, the main display may be updated to identify the winner of a gaming interactive experience, to display a summary of an interactive experience or simply to indicate that the interactive experience has ended.

Similarly, participant components of the interactive program may display the outcome of an interactive experience for the participant, such as a message indicating the end of an interactive experience on the personal display shown on a secondary display screen of a participant device.

During step 1010, some interactive experience control messages may be transmitted only within an interactive node. For example, if an interactive experience control message indicates a change in the state of a game that is relevant only to one participant or only to participants at the interactive node from which the message originates, it may not be transmitted by the local controller of that node to the coordination node. In some embodiments, a local controller may transmit only information that is relevant to the coordination node or to participants at other interactive nodes in an interactive experience control message.

In some embodiments, the local controllers or the coordination node or both may modify interactive program control message such that only information that is relevant to participants at an interactive node is sent to that node. This may reduce the number and size of interactive program control messages, allowing an interactive experience to by synchronized more quickly or with the use of less communication bandwidth or both.

Method 1000 then ends.

Optionally, method 1000 may be performed repetitively, allowing the interactive experience to be repeated.

Method 1000 provides an interactive experience to a plurality of participants located in disparate locations. Each participant shares the same interactive experience and view common information on a main display. Simultaneously, each participant has a personal display shown on the participant's personal device that provides a rich graphical experience that is personal to the individual participant.

Some interactive experiences may permit participants to join or leave an interactive experience while the experience is ongoing. For example, in some betting interactive experiences, such as some poker experiences, participants may be able to join and leave the interactive experience individually, with the interactive experience continuing before and after a particular participant participates in the interactive experience.

In an interactive experience in which a participant may join after the interactive experience has started, a participant may complete steps 1002 and 1004 independently. Step 1006 may not be required in such a situation, particularly if the local controller used by the newly enrolled participant is also in use by other participants.

In an interactive experience in which a participant may leave or be removed from before the interactive ends for other players, a departing participant may move to step 1010 while other participants continue in the interactive experience in step 1008.

In some interactive experiences, a participant device may not require updates in step 1008. For example, in some interactive experiences, all components required for a participant to participate in the experience may be delivered in step 1004 and it may not be necessary to transmit update messages to the participant devices during step 1008. In such experiences, update messages are transmitted to the coordination node based on inputs from participants. The coordination node then transmits corresponding update messages to the interactive nodes allowing the local controllers to update the respective main displays.

Reference is made to FIG. 1. Various embodiments may deliver an interactive experience to participants at specific types of interactive nodes.

In some embodiments, each interactive node may be a public node 104. In other embodiments, each interactive node may be a private node 106. In other embodiments, different combinations of public, private and individual nodes may be permitted.

Figure 11:
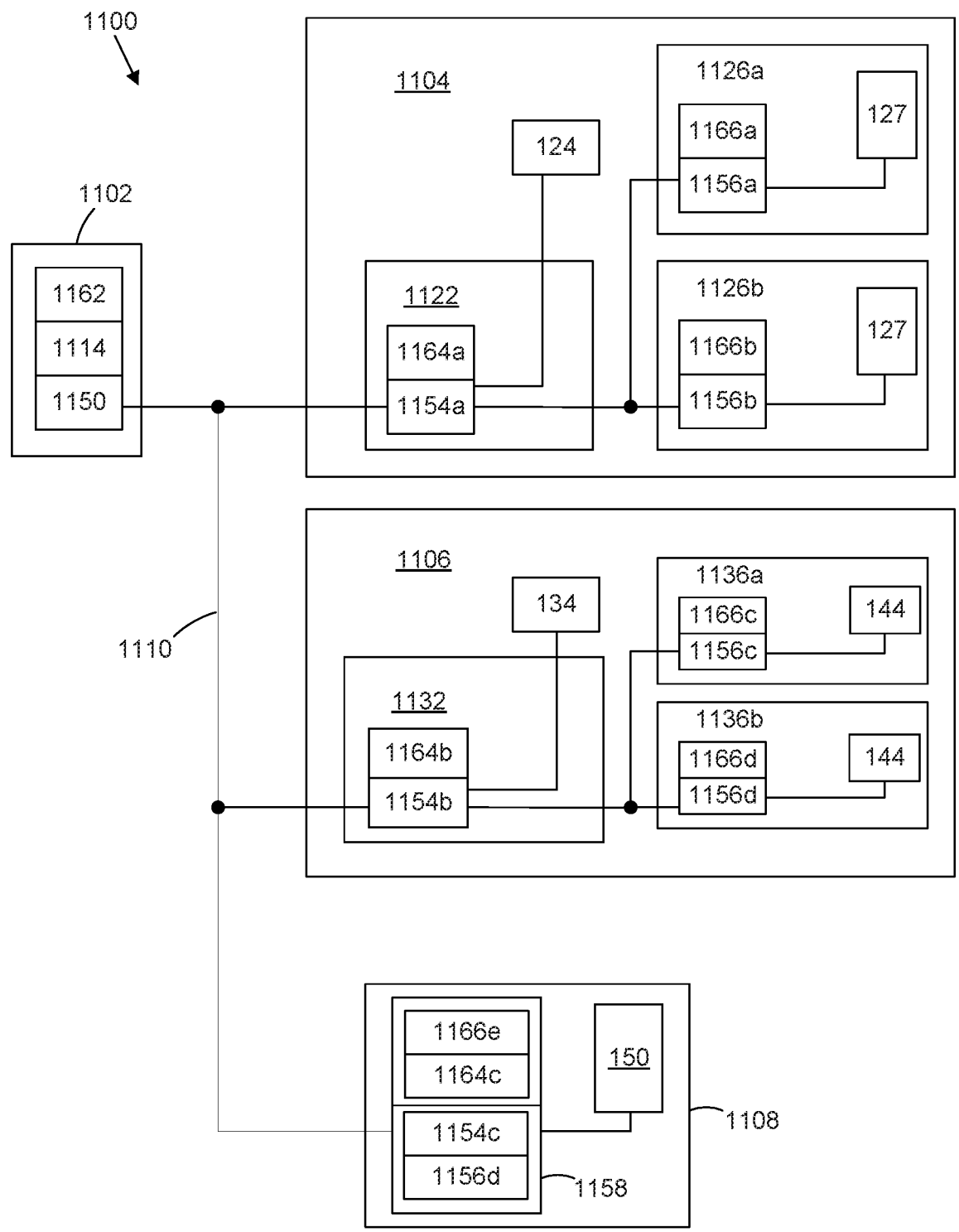
FIGS. 11 and 12 illustrate other multiple location interaction system.

Reference is made to FIG. 11, which illustrates another multiple location interaction system 1100. FIG. 11 illustrates system 1100 from a software architecture perspective. The various nodes and devices of system 1100 are similar in structure and operation to the corresponding nodes and devices of system 100 and corresponding nodes, device and components are identified by similar reference numbers.

System 1100 includes a coordination node 1102, one or more public nodes 1104 (only one of which is illustrated), one or more private nodes 1106 (only one of which is illustrated) and one or more individual nodes 1108 (only one of which is illustrated).

System 1100 includes a coordination framework that includes central coordination components 1150, local coordination components 1154 and participant coordination components 1156.

The interactive programs stored in the coordination node 1102 include central components 1162, local controller components 1164 and participant components 1166.

When system 1100 is used to provide an interactive experience using a particular interactive program, the components of system 100 operate as follows.

At the coordination node 1102, the central components operate with a program control module 1114. The program control module 1114 operates with the central coordination components 1150. The central components of the interactive program provide functions and services that are specific to the interactive experience or to the interactive program. The program control module manages the coordination of the interactive experience for all participants in the interactive experience at the various participant nodes, including management of the main display at each interactive node, the personal display at each participant device and the processing of participant inputs received from each participant device. The central coordination components may provide communication and other services to the program control module 1114 and the central coordination components 1150. In some embodiments, the program control module 1114 may be combined with the central coordination components 1150 such that an integrated program control module provides the functions of both a program control module and the central coordination components.

At each local controller 1122, 1132, local controller components 1164 operate with the local coordination components 1154. The local controller components 1164 provide services and functions that are specific to the interactive experience or the interactive program. The local coordination components 1154 may provide communication and other services. The local coordination components also manage the main display shown on the primary screen in a public or private node.

At each participant device 1126 or 1136, participant components 1166 operate with participant coordination components 1156. The participant components 1166 provide services or functions that are specific to the interactive experience or interactive program. The participant coordination components 1156 may provide communication and other services to the participant components 1166.

Typically, the coordination framework provides coordination services that are common to a plurality of interactive programs. In such embodiments, the interactive programs may rely on the coordination framework for coordination services, allowing developers of the interactive programs to limit interactive programs and their respective components to software, data and other content that is specific to the interactive experience provided by the interactive program. Coordination services that are required by a plurality of interactive programs are provided by the coordination framework. This may reduce the size of the local and participant components that must be installed respectively on local controller and participant devices before an interactive experience can be provided. It may also serve to make interactive experiences more uniform, allowing participants to more easily participate in new interactive experiences using previously acquired knowledge and skills.

A coordination framework may provide various services.

In some embodiments, the coordination framework may provide internode communication services. For example, coordination components 1150, 1154 and 1156 may provide a message or data passing service that allow interactive program components 1162, 1164 and 1166 to communicate with one another. The coordination components communicate with one another. The interactive program components communicate with the respective coordination components installed at the same nodes, and communicate indirectly with one another through the coordination components.

In some embodiments, the coordination framework may provide participant account services. For example, the central coordination components may interface with a participant database stored in the coordination node. The central coordination components may provide details from a participant's account to an interactive application, either directly to a central component or through other coordination framework components to a local controller component or to a participant device component of an interactive program. The interactive program component may information from the participant's account to personalize or modify the participant's experience. In addition, the interactive application may provide updated information for a participant's account to the central coordination component to be stored in the participant's account. Such updated account information may be recorded in the participant database.

The coordination framework may also provide account creation services. Participant coordination components installed on the participant devices may include an account creation function. When a participant accesses system 1100 using either a system access application or a participant component of an interactive application, the participant may wish to create an account. The participant coordination components may include an account creation module that collects the information required for a participant account, and then forward such information to central coordination components. The central coordination components may then create a new account for the participant in the participant database.

In some embodiments, the coordination framework may provide device interface services. For example, participant coordination components may interface with input devices built into or attached to a participant device. The participant coordination components may convert various types of inputs received from various types of input devices into a consistent set of inputs that are then provided to the participant components, local controller components and central components of an interactive application. This allows the same or similar participant components to be installed on participant devices regardless of their different input devices. Other differences in the participant devices may still require different participant components to be installed on different participant devices.

In some embodiments, the coordination framework may provide content delivery services that allow content for an interactive experience to be pushed from the coordination node to local controllers and participant devices at interactive nodes. For example, an interactive program may use the coordination framework to push media components for an interactive experience to the interactive nodes at the start of or during an interactive experience.

In some embodiments, the coordination framework may provide participant interaction services. For example, the coordination framework may provide video chat, voice chat, multimedia messaging, social media interfaces (such as an interface to automatically transmit information to or using Facebook™ or Twitter™).

In some embodiments, the coordination framework may provide a reward system. For example, the coordination framework or an interactive application may reward participants for participating or succeeding in various interactive experiences. A participant's interactive experience may be varied based on the rewards earned by the participant. Typically, the participant's earned rewards will be recorded in the participant's account record in the coordination node. The participant's reward status may be provided to an interactive application as described above in relation to account services.

In some embodiments, the reward system may provide coupons, incentives or other information to participants. In some embodiments, participant preferences may be recorded with a player's account. A participant's preferences may be used to provide a more customized experience to the participant, including the provision in-game and other advertising, coupons and other information.

In some embodiments, the coordination framework may provide graphical and physics processing services. For example, the coordination may provide mathematical algorithms and routines that calculate outcomes for events such as collisions, scene management, graphic layering and other processing intensive activities, eliminating the need for the components of an interactive program to include such algorithms and components. Like other services provided by the coordination framework, components of the interactive applications may invoke such services, reducing the need to include such services in the interactive application components.

In some embodiments, the coordination framework may provide positioning services. For example, the participant coordination components in a coordination framework may use positioning devices such as global position system sensors, Wi-Fi (802.11) antennas and other devices built into a participant device to estimate the location of a participant device. The position may be provided to an interactive program to allow a participant's experience to be customized based on the player's location.

In some embodiment various participants may be organized into teams. For example, in the car racing example, participants may be organized into a first team and a second team such that one team wins if a specified condition is met. The program control module in such embodiments tracks the membership of participants in each team. The personal displays shown to members of each team may include information that is relevant to the entire team. In this way, the participants on one team are able to share information that is not provided to the other team. In some embodiments, all participants at a particular node may be on the same team. In such embodiments, the main display shown at the node may include information to be shown to the team.

In systems 100 and 1100, three types of interactive nodes are described: public nodes, private nodes and individual nodes. In some embodiments, only public nodes may be provided. In other embodiments, only private nodes may be provided. In other embodiments, only public and private nodes may be provided. In other embodiments, only individual nodes may be provided. In some embodiments, only public and individual nodes may be provided. In some embodiments, only private and individual nodes may be provided. In each case, a participant at any node is able to see a main display that contains information that is also shown on other main display and a personal display that contains information specific to that participant.

Figure 12:
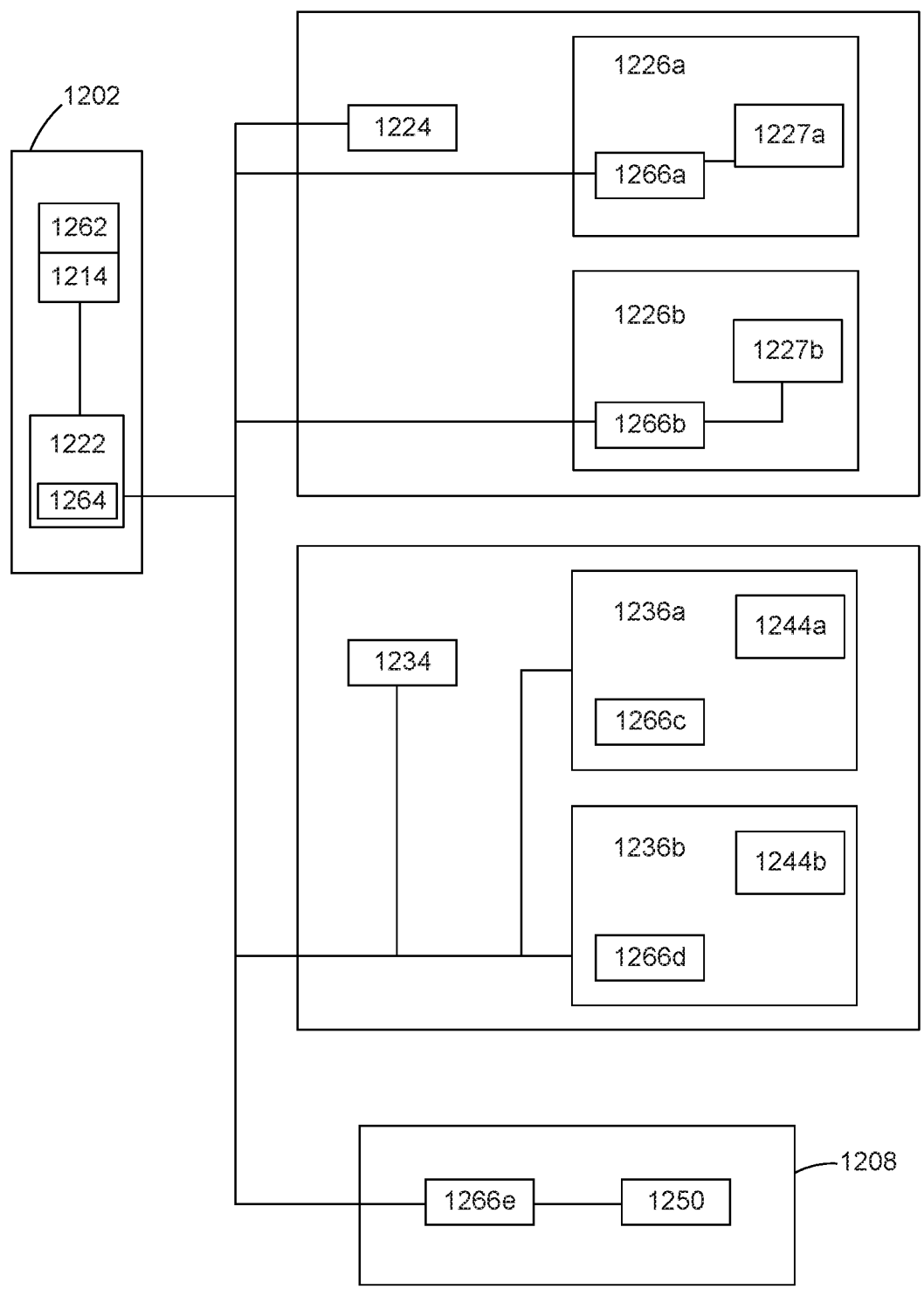

Reference is next made to FIG. 12, which illustrates another multiple location interaction system 1200. Various elements of system 1200 are similar to elements of system 100 and 1100. Corresponding elements are identified by similar reference numerals.

System 1200 includes a coordination node 1202, one or more public nodes 1204 (only one of which is illustrated), one or more private nodes 1206 (only one of which is illustrated) and one or more individual nodes 1208 (only one of which is illustrated).

Public node 1204a does not include a local controller. Coordination node 1202 includes an interactive node controller module 1222. Interactive node controller module 1222 includes interactive node control components 1264. Interactive node control components communicate with a primary display screen 1234a at public node 1204a and also with one or more participant devices 1226. The interactive node control components 1264 provide the functions described above in relation to the local controllers of public nodes 104 and 1104 for public node 1104.

Similarly, private node 1206a does not have a local controller. Instead the interactive node control components in the interactive node control module 1264 provide the functions of a local controller of private nodes 106 and 1106.

Individual node 1208a also does not have local controller components. Instead the interactive node control components 1264 in the interactive node control module 1122 provide the functions of a local controller of individual nodes 108 and 1108.

In system 1200, the interactive node control components 1264 in the coordination node 1202 operate as a virtual local controller for some or all of the interactive nodes in the system. For interactive nodes that utilize the interactive node control components 1264, the interactive node control components control a main display at each interactive node and communicates with and control each participant device at the interactive node.

In some embodiments, the interactive node control module 1122 may be integrated with other components in the coordination node. For example, interactive node control module 1122 may be integrated with a program control module 1214. In an embodiment that includes a coordination framework, the interactive node control module 1122 may be integrated, alternatively or additionally, be integrated with the central coordination components. In such embodiments, control of the main display In various embodiments, the interactive node control module 1222 may operate in the same or a different location or the same or a different computing device than the coordination node. For example, in some embodiments, the interactive node control module may operate at a node within network 1210 and may communicate with the coordination node and with interactive nodes through the network. Some embodiments may include more than one interactive node control module with each interactive node control module controlling the operation of one or more interactive nodes.

The present invention has been described here by way of example only. Various modification and variations may be made to these exemplary embodiments without departing from the spirit and scope of the invention.

The invention claimed is:

1. A multiple location interaction system for providing a shared interactive experience, the multiple location interaction system comprising:
   a coordination node comprising at least one interactive node control component, the coordination node further comprising a program database for recording a plurality of interactive experiences;
   a plurality of interactive nodes selected from the group consisting of public nodes, private nodes, and individual interactive nodes, each of the plurality of interactive nodes being located at a venue in different location, the plurality of interactive nodes comprising a first interactive node located at a first venue and a second interactive node located at a second venue, the second venue being at a geographically remote location from the first venue; and
   a network coupling the coordination node to the interactive nodes;
   wherein
   the coordination node manages the shared interactive experience at the plurality of interactive nodes such that the coordination node is configurable to provide a first interactive experience to a first subset of interactive nodes comprising the first and the second interactive nodes, and a second interactive experience to a second subset of interactive nodes;
   the first interactive node comprises a first primary display screen for displaying a first main display of the first interactive experience and at least one first participant device operated by a corresponding at least one first participant, each first participant device comprising a secondary display screen for displaying a personalized display of the first interactive experience that is individually configurable on that participant device;
   the second interactive node comprises a second primary display screen for displaying a second main display of the first interactive experience and at least one second participant device operated by a corresponding at least one second participant, each second participant device comprising a secondary display screen for displaying a personalized display, wherein the second primary display screen is remote from the first primary display screen;
   the at least one interactive node control component communicates with the first and second primary display screens and the participant devices of each of the first and second interactive nodes;

the first and second main displays of the first and second interactive nodes are configured to show at least some common information relating to the first interactive experience;

the first and second main displays of each of the first interactive node and the second interactive node are configured to provide unique information specific to the corresponding interactive node such that the unique information provided on the first main display of the first interactive node is different than the unique information provided on the second main display of the second interactive node, the unique information provided on the first main display of the first interactive node being related to the first venue, and the unique information provided on the second main display of the second interactive node being related to the second venue;

the first main display defines a first integrated experience display that includes both the unique information specific to the first interactive node and the common information relating to the first interactive experience;

the second main display defines a second integrated experience display that includes both the unique information specific to the second interactive node and the common information relating to the first interactive experience;

the coordination node further manages the first interactive experience by receiving one or more participant inputs from one or more participant devices of each of the first and second interactive nodes and then causing modifications required by the one or more participant inputs to one or both of the first main display and the second main display; and if the one or more participant inputs affect another participant's interactive experience, the coordination node generates and transmits a participant device message to the other participant's device to provide personal display information to render a personal display on the secondary display screen of the other participant's device, wherein the participant device message includes details of participation in the first interactive experience of one or more participants providing the corresponding one or more participant inputs.

2. The system of claim 1 wherein at least one of the first and second interactive nodes is a public node located at a public location, and wherein the public node includes:
a public node local controller configured to be coupled to the primary display screen and the at least one participant device of the corresponding interactive node.

3. The system of claim 1 wherein at least one of the first and second interactive nodes is a private node located at a private location and wherein the private node includes:
a private node local controller configured to be coupled to the primary display screen and the at least one participant device of the corresponding interactive node.

4. The system of claim 3 wherein the private node local controller of at least one private node is a gaming system console.

5. The system of claim 1 wherein:
the at least one interactive node comprises at least one public node, each public node located at a public location; and
each public node includes
a public node local controller configured to be coupled to the primary display screen and the at least one participant device of that interactive node.

6. The system of claim 1 wherein:
the at least one interactive node comprises at least one private node, each private node located at a private location; and
each private node includes
a private node local controller configured to be coupled to the primary display screen and the at least one participant device of that interactive node.

7. The system of claim 1 wherein at least one additional interactive node is an individual interactive node comprising an individual participant device having an individual display screen for displaying the main display and the personalized display to the participant at the individual interactive node, and wherein the at least one interactive node control component is operable to communicate with the individual display screen.

8. The system of claim 7 wherein the main display and the personalized display are displayed simultaneously on the individual display screen.

9. The system of claim 7 wherein the main display and the personalized display are displayed alternatively on the individual display screen.

10. The system of claim 1 wherein the coordination node includes a program database for recording one or more interactive programs and at least some of the interactive programs recorded in the program database include one or more participant components usable by a participant to individually configure the personalized display for that participant.

11. The system of claim 1 wherein the coordination node includes a participant database for recording participant records containing information about one or more participants.

12. The system of claim 1 wherein the first venue is a first auditorium in a movie theater and the second venue is a second auditorium in the movie theater.

13. A method of providing a shared interactive experience to two or more participants located at a plurality of interactive nodes, each participant corresponding to a participant device, and the plurality of interactive nodes comprising a first interactive node located at a first venue and a second interactive node located at a second venue that is geographically remote from the first interactive node, the method including:
managing, using a program control module at a coordination node wherein the coordination node is in communication with the plurality of interactive nodes over a network, the shared interactive experience by providing a first interactive experience to a first subset of interactive nodes comprising the first and the second interactive nodes, and a second interactive experience to a second subset of interactive nodes, wherein each of the first and second interactive nodes are selected from the group consisting of public nodes, private nodes and individual interactive nodes;
displaying a first main display on at least one first primary display screen at the first interactive node such that the first main display is visible to each participant located at that interactive node;
displaying a personalized display on a secondary display screen of each of at least one first participant device at the first interactive node, wherein each participant device at the first interactive node is used by one of the participants at the first interactive node to participate in the first interactive experience;
displaying a second main display on at least one second primary display screen at the second interactive node such that the second main display is visible to each participant located at that interactive node, the at least one second primary display screen being remote from the at least one first primary display screen;

displaying a personalized display on a secondary display screen of each of at least one second participant device at the second interactive node, wherein each participant device at the second interactive node is used by one of the participants at the second interactive node to participate in the first interactive experience;

displaying at least some common information relative to the first interactive experience at the first and second main displays of the first and second interactive nodes;

displaying, at the first and second main displays of each of the first interactive node and the second interactive node, unique information specific to the corresponding interactive node, such that the unique information provided on the first main display of the first interactive node is different than the unique information provided on the second main display of the second interactive node, the unique information provided on the first main display of the first interactive node being related to the first venue, and the unique information provided on the second main display of the second interactive node being related to the second venue;

wherein at least one interactive node control component is provided at the coordination node to communicate with the at least one primary display screen and the at least one participant device of each of the first and second interactive nodes, the first main display defines a first integrated experience display that includes both the unique information specific to the first interactive node and the common information relating to the first interactive experience, and the second main display defines a second integrated experience display that includes both the unique information specific to the second interactive node and the common information relating to the first interactive experience;

further managing, at the coordination node the first interactive experience by receiving one or more participant inputs from one or more participant devices of each of the first and second interactive nodes and then causing modifications required by the one or more participant inputs to one or both of the first main display and the second main display; and if the one or more participant inputs affect another participant's interactive experience, generating and transmitting by the coordination node a participant device message to the other participant's device to provide personal display information to render a personal display on the secondary display screen of the other participant's device, wherein the participant device message includes details of participation in the first interactive experience of one or more participants providing the corresponding one or more participant inputs.

14. The method of claim 13 further comprising providing the first interactive experience for at least one participant based on demographic information about the participant recorded in a participant database.

15. The method of claim 13 wherein at least one interactive node is an individual interactive node comprising an individual participant device having an individual display screen for displaying the main display and the personalized display to the participant at the individual interactive node, and wherein the at least one interactive node control component is operable to communicate with the individual display screen.

16. The method of claim 15 wherein the main display and the personalized display are displayed simultaneously on the individual display screen.

17. The method of claim 15 wherein the main display and personalized display are displayed alternatively on the individual display screen.

18. The method of claim 13 further comprising coordinating the shared interactive experience by transmitting program update messages between the plurality of interactive nodes and the coordination node.

19. The method of claim 13 further comprising selecting the first interactive experience in response to inputs from at least some of the participants operating the corresponding participant devices in the first subset of interactive nodes.

20. The method of claim 13, wherein the first venue is a first auditorium in a movie theater and the second venue is a second auditorium in the movie theater.

* * * * *